(12) United States Patent
Lee

(10) Patent No.: US 10,442,303 B2
(45) Date of Patent: Oct. 15, 2019

(54) CHARGING CONTROL APPARATUS AND CONTROL METHOD THEREFOR

(71) Applicant: LG ELECTRONICS INC., Seoul (KR)

(72) Inventor: Sanghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/750,697

(22) PCT Filed: Sep. 9, 2015

(86) PCT No.: PCT/KR2015/009493
§ 371 (c)(1),
(2) Date: Feb. 6, 2018

(87) PCT Pub. No.: WO2017/039046
PCT Pub. Date: Mar. 9, 2017

(65) Prior Publication Data
US 2018/0215280 A1    Aug. 2, 2018

(30) Foreign Application Priority Data

Aug. 28, 2015 (KR) .......................... 10-2015-0122129

(51) Int. Cl.
*H01R 13/627* (2006.01)
*H01R 13/639* (2006.01)
(Continued)

(52) U.S. Cl.
CPC ........... *B60L 11/1846* (2013.01); *B60L 53/14* (2019.02); *B60L 53/16* (2019.02); *B60L 53/18* (2019.02);
(Continued)

(58) Field of Classification Search
CPC .............. B60L 11/1816; B60L 11/1846; B60L 2230/16; B60L 2230/12; B60L 3/04;
(Continued)

(56) References Cited

U.S. PATENT DOCUMENTS

2012/0135626 A1    5/2012 Tormey et al.
2014/0170879 A1*   6/2014 Kahara ................... B60L 1/003
                                                         439/304
(Continued)

FOREIGN PATENT DOCUMENTS

JP    2012-186948 A    9/2012
JP    2013-106391 A    5/2013
(Continued)

*Primary Examiner* — Dionne Pendleton
(74) *Attorney, Agent, or Firm* — Birch, Stewart, Kolasch & Birch, LLP

(57) ABSTRACT

The present invention relates to a charging control apparatus and a control method therefor. A charging control apparatus according to an embodiment of the present invention comprises: a communication unit which performs wireless communication with at least one communication device including a vehicle; a charging connector electrically connected to a charging inlet provided in the vehicle; a locking unit which is disposed in the charging connector, so as to perform or release locking between the charging connector and the charging inlet; a control unit which checks whether the ID of the vehicle, received by the communication unit, is included in a pre-stored authentication information list, in response to an electrical connection between the charging connector and the charging inlet, and when the ID of the vehicle is included in the pre-stored authentication information list, determines whether to release the locking between the charging connector and the charging inlet, depending on the location of a previously authenticated portable device, and controls the locking unit according to the determination.

20 Claims, 20 Drawing Sheets

(51) Int. Cl.

| | | |
|---|---|---|
| *B60L 11/18* | (2006.01) | |
| *B60L 53/16* | (2019.01) | |
| *B60L 53/18* | (2019.01) | |
| *B60R 25/045* | (2013.01) | |
| *B60R 25/10* | (2013.01) | |
| *B60R 25/23* | (2013.01) | |
| *B60R 25/25* | (2013.01) | |
| *B60R 25/30* | (2013.01) | |
| *B60R 25/33* | (2013.01) | |
| *B60L 53/14* | (2019.01) | |
| *B60L 53/65* | (2019.01) | |
| *B60L 53/30* | (2019.01) | |

(52) U.S. Cl.
CPC ............ *B60L 53/305* (2019.02); *B60L 53/65* (2019.02); *B60R 25/045* (2013.01); *B60R 25/1004* (2013.01); *B60R 25/23* (2013.01); *B60R 25/252* (2013.01); *B60R 25/257* (2013.01); *B60R 25/305* (2013.01); *B60R 25/33* (2013.01); *H01R 13/6397* (2013.01); *B60L 2270/32* (2013.01); *B60R 2325/103* (2013.01); *H01R 2201/26* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .......... B60L 53/16; B60L 53/65; B60L 53/18; B60L 53/35; B60L 2270/32; B60L 53/305; B60L 53/14; B60L 53/60; B60L 11/1818; B60L 2250/16; B60L 2270/34; B60L 3/0069; B60L 58/12; B60L 15/20; B60L 1/003; B60L 2240/28; B60L 2240/36; B60L 2240/42; B60L 2240/54; B60L 2240/545; B60L 2250/10; B60L 2250/20; B60L 2260/22; B60L 3/0046; B60L 50/16; B60L 50/50; B60L 50/52; B60L 53/10; B60L 53/11; B60L 53/12; B60L 53/66; B60L 53/665; B60L 53/80; B60L 58/13; B60L 58/14; B60L 58/15; B60L 58/24; B60L 58/27; B60R 2325/103; B60R 25/045; B60R 25/1004; B60R 25/23; B60R 25/252; B60R 25/257; B60R 25/305; B60R 25/33; B60R 16/03; B60R 25/01; B60R 25/104; B60R 25/24; H01R 13/6397; H01R 13/6275; H01R 2201/26; H01R 13/6278; H01R 13/6683; H01R 13/701; H01R 2107/00; H01R 13/639; H01R 24/20; Y02T 10/7005; Y02T 10/7088; Y02T 90/121; Y02T 90/128; Y02T 90/14; Y02T 90/163; Y02T 90/169; Y02T 10/7072; Y02T 90/16; Y02T 10/7055; Y02T 10/6269; Y02T 10/645; Y02T 10/70; Y02T 10/7077; Y02T 10/72; Y02T 10/7275; Y02T 90/122; Y02T 90/168; Y04S 30/14; Y04S 30/12; B60K 2015/0546; B60K 15/05; B60K 2001/008; B60K 2015/0561; B60K 2370/15; H02J 2007/0001; H02J 7/0027; H02J 7/0004; H02J 7/0036; H02J 7/0047; H02J 7/02; B60W 10/26; B67D 7/04; B67D 7/0498; E05B 47/0001; E05B 77/54; E05B 81/70; E05B 83/34; G01C 21/3407; G06Q 10/0631; G06Q 30/06; G06Q 30/0635; G06Q 50/06; G06Q 50/10; G08B 21/18; H01H 36/00; H02K 11/22; H03K 17/97; Y10T 403/59; H04B 3/54; H04B 3/56; Y10S 320/12

See application file for complete search history.

(56) References Cited

U.S. PATENT DOCUMENTS

| | | | |
|---|---|---|---|
| 2015/0048644 A1* | 2/2015 | Georgi | B60K 15/05 296/97.22 |
| 2016/0321740 A1* | 11/2016 | Hill | G06Q 30/0635 |
| 2017/0217403 A1* | 8/2017 | Kim | B60L 11/1818 |
| 2017/0341524 A1* | 11/2017 | Heiss | B60L 53/16 |
| 2018/0114386 A1* | 4/2018 | Steinmetz | G07C 9/00571 |
| 2018/0175563 A1* | 6/2018 | Konradt | H01R 13/639 |

FOREIGN PATENT DOCUMENTS

| | | |
|---|---|---|
| JP | 2013-135549 A | 7/2013 |
| JP | 2014-116998 A | 6/2014 |
| JP | 2014-124027 A | 7/2014 |
| KR | 10-2013-0020229 A | 2/2013 |
| KR | 10-2015-0044273 A | 4/2015 |
| KR | 10-2015-0077360 A | 7/2015 |

* cited by examiner

【FIG. 1】
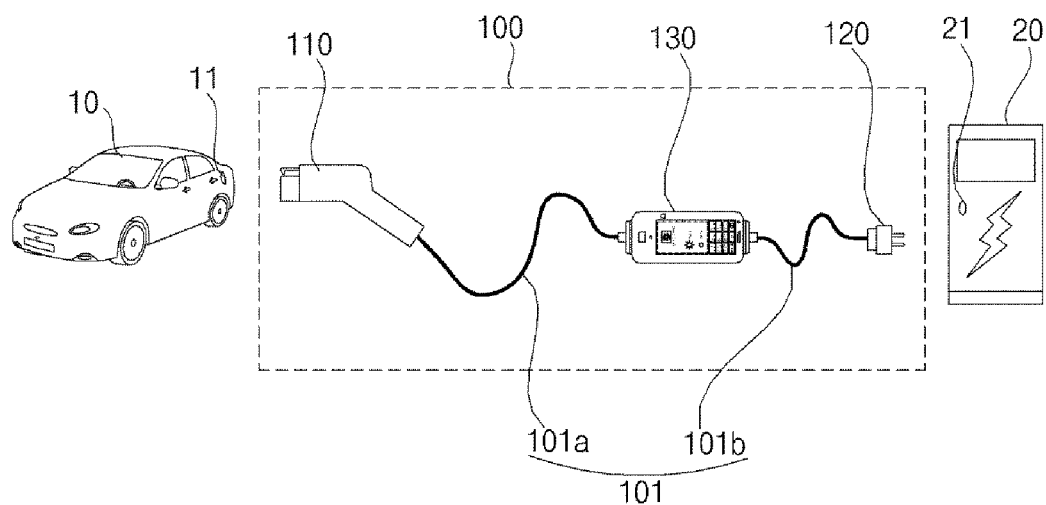
【FIG. 2】
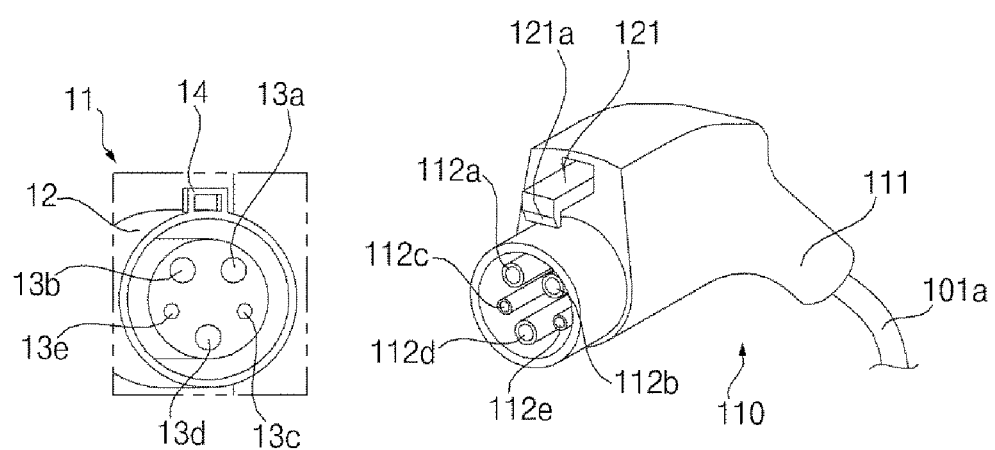

[FIG. 3]
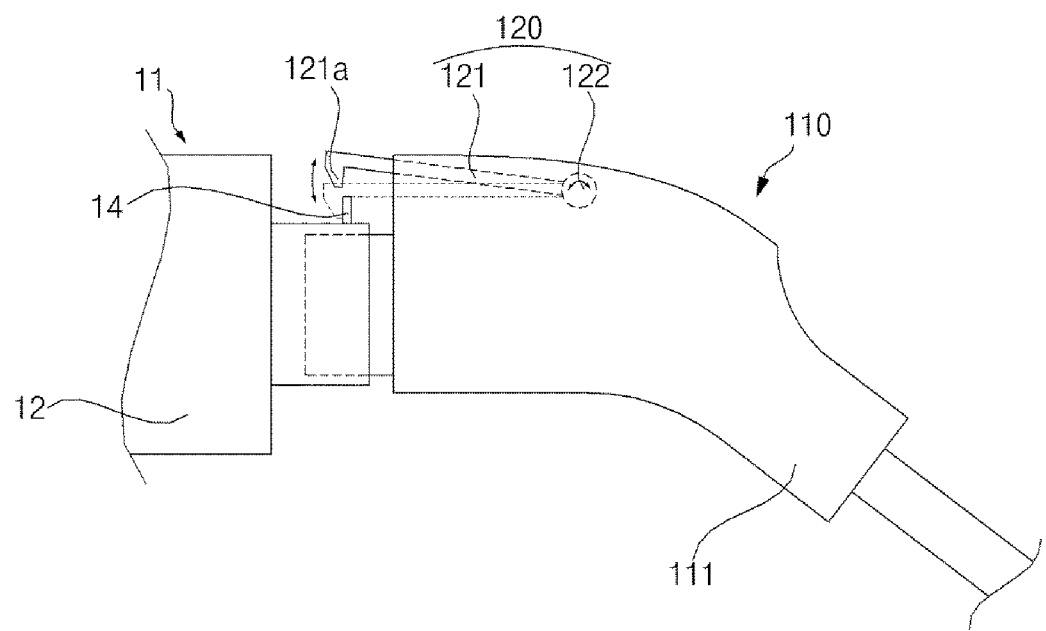

[FIG. 4]
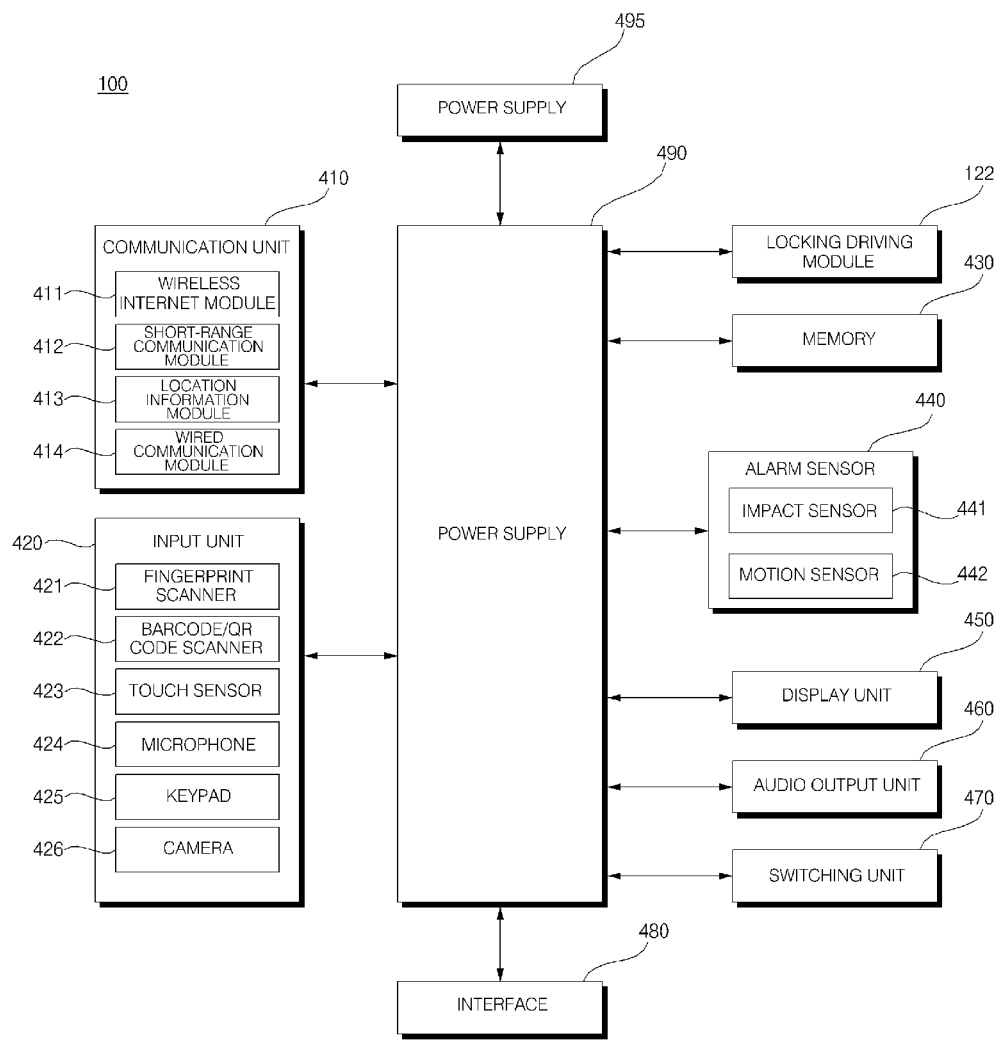

【FIG. 5】
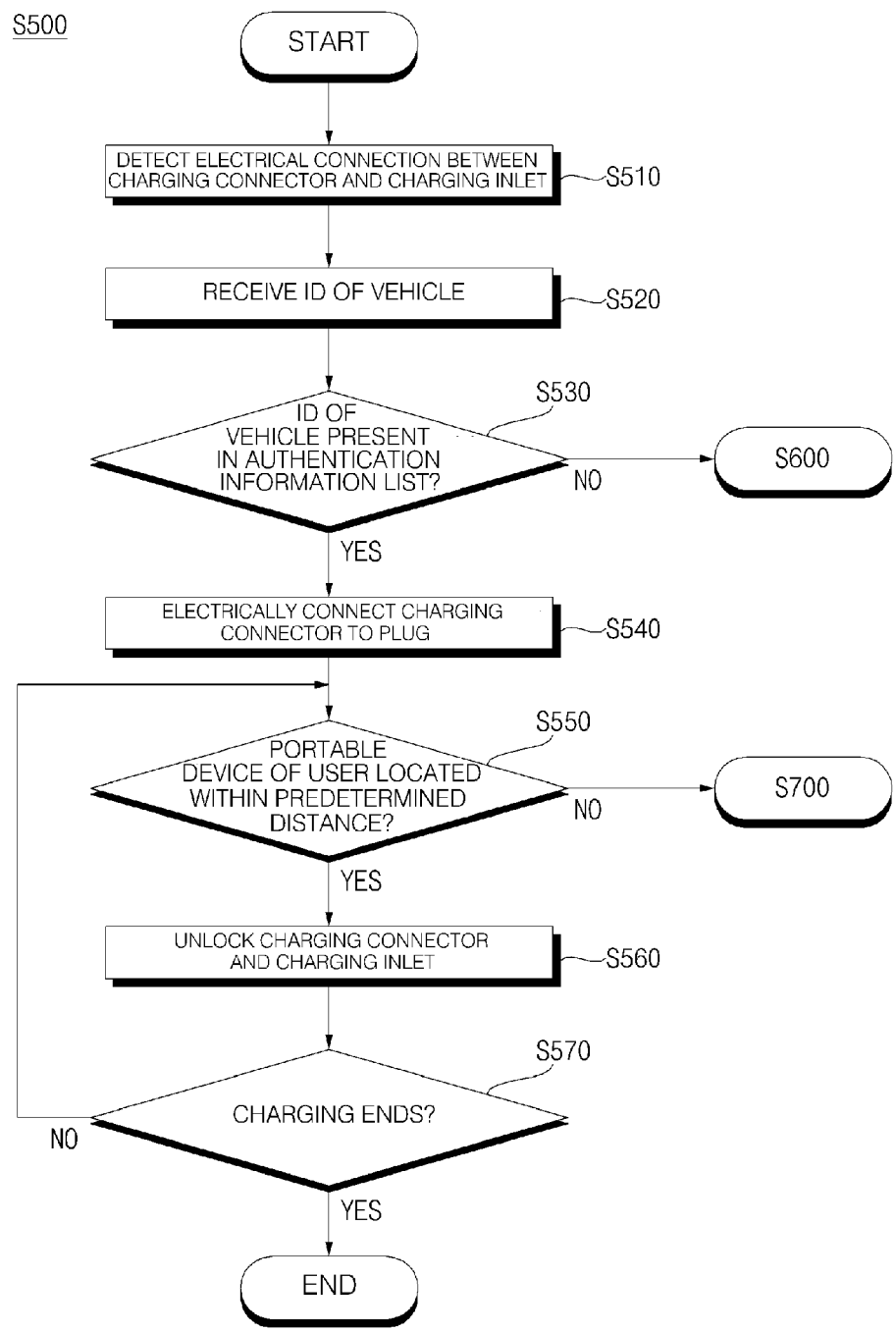

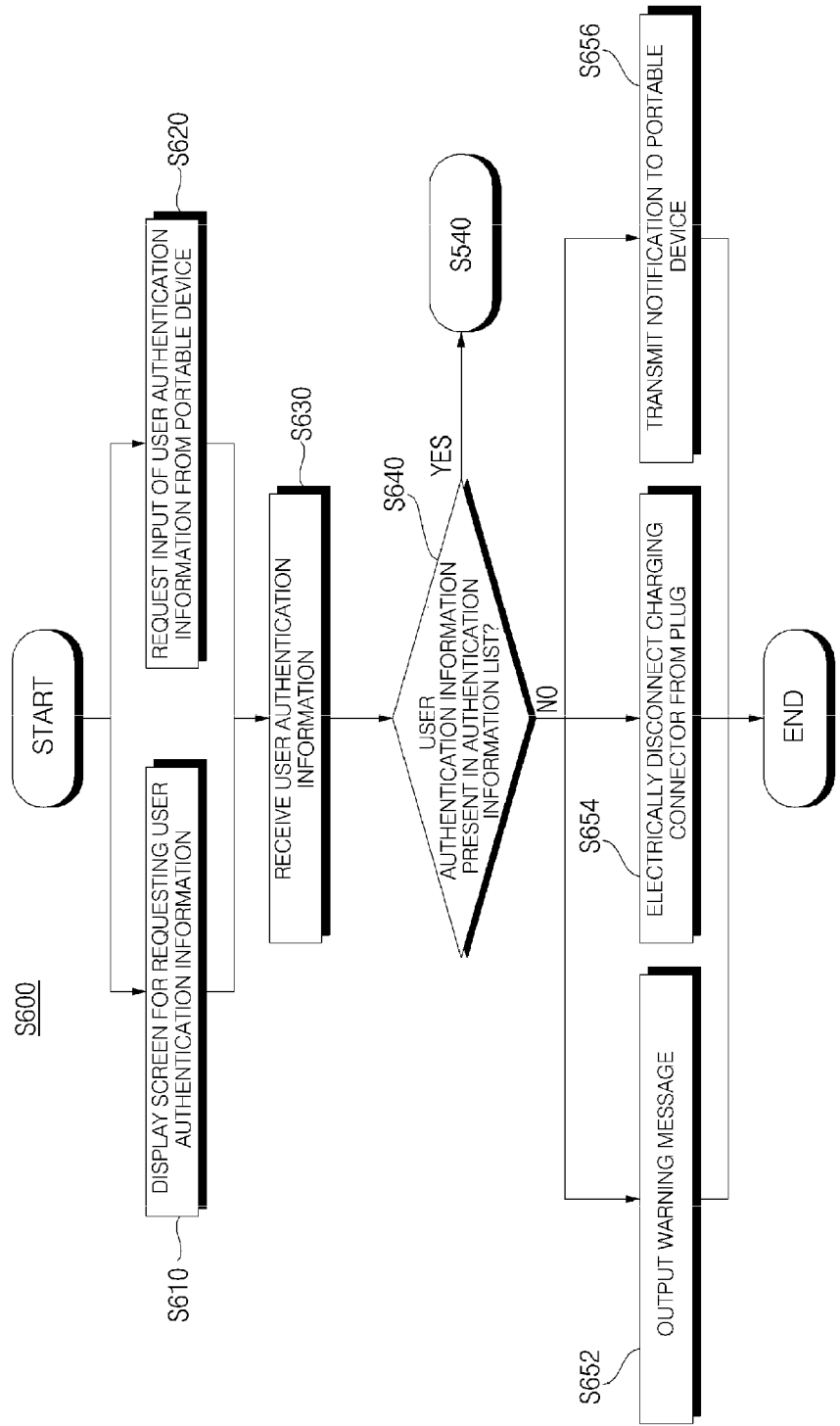
[FIG. 6]

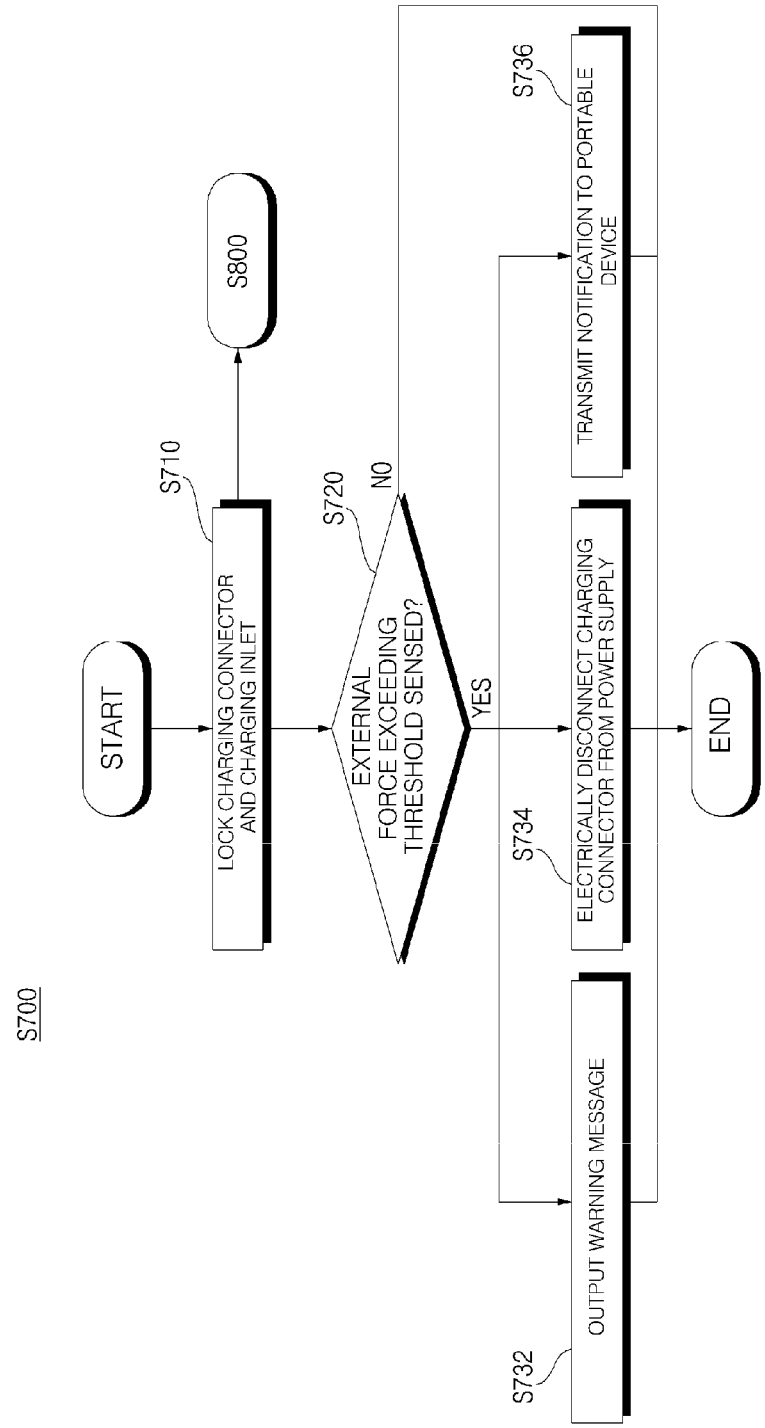

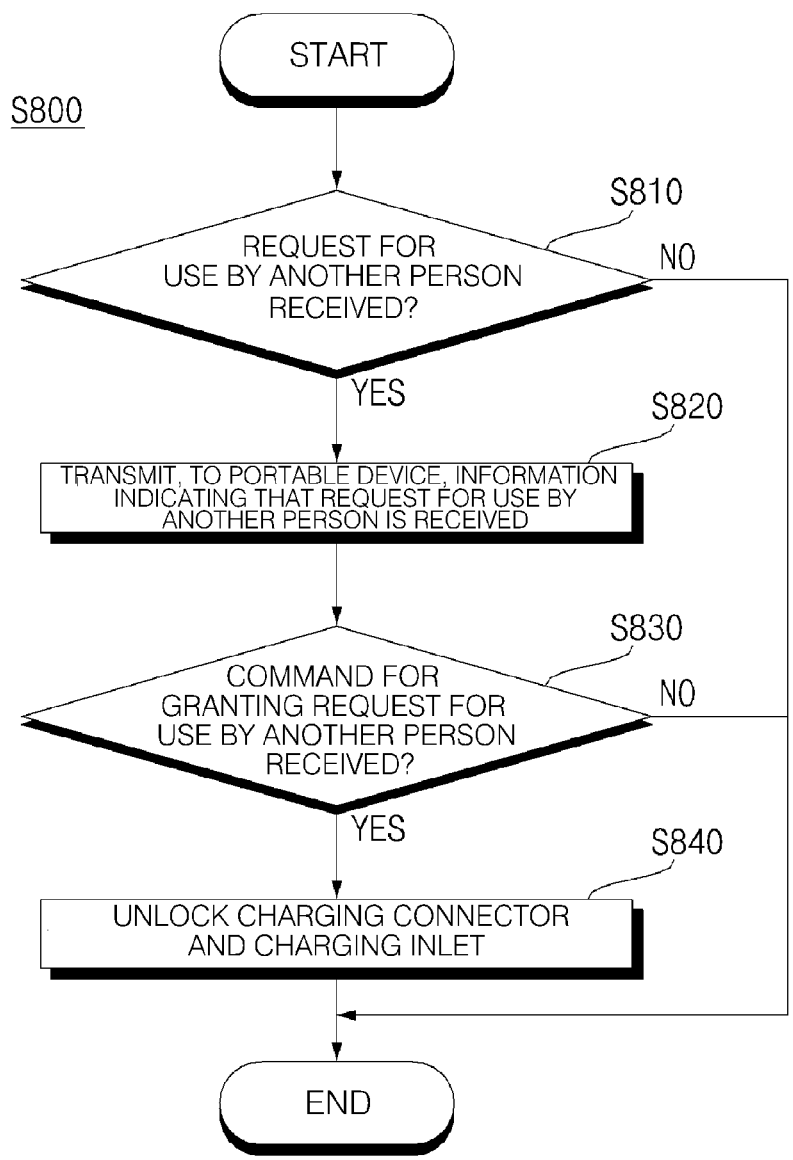
[FIG. 8]

[FIG. 9a]
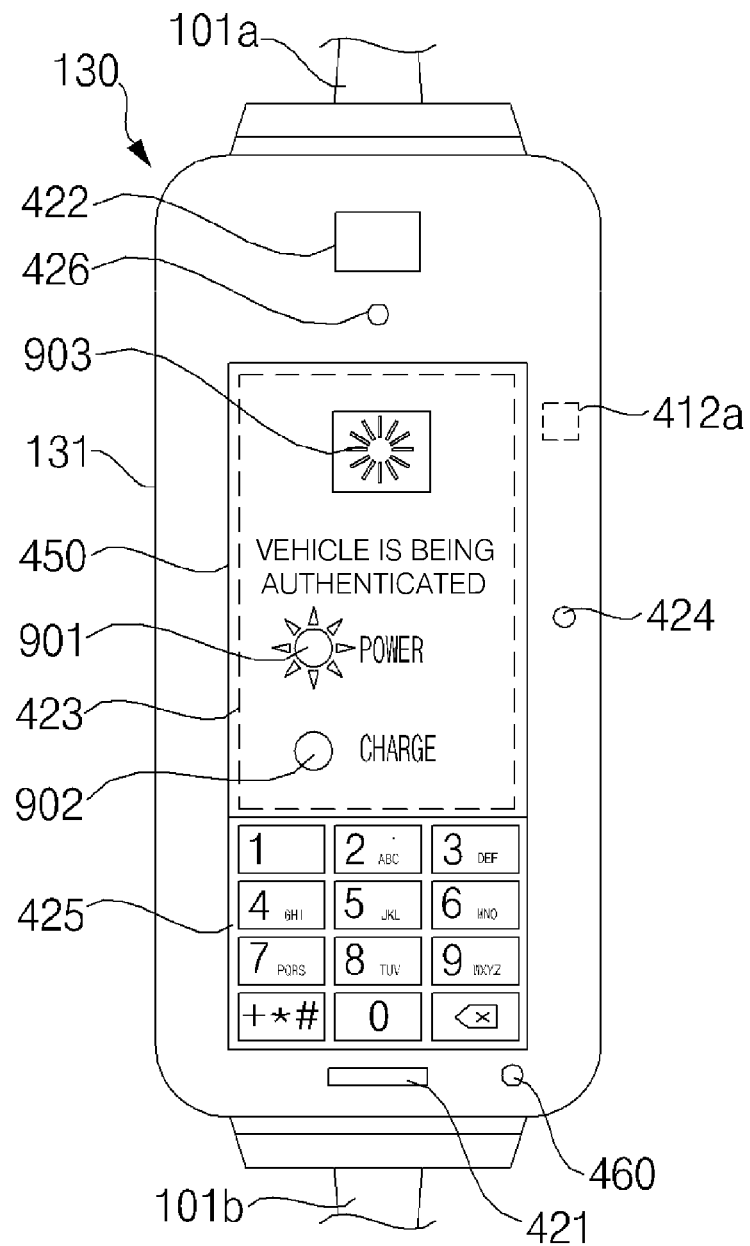

[FIG. 9b]
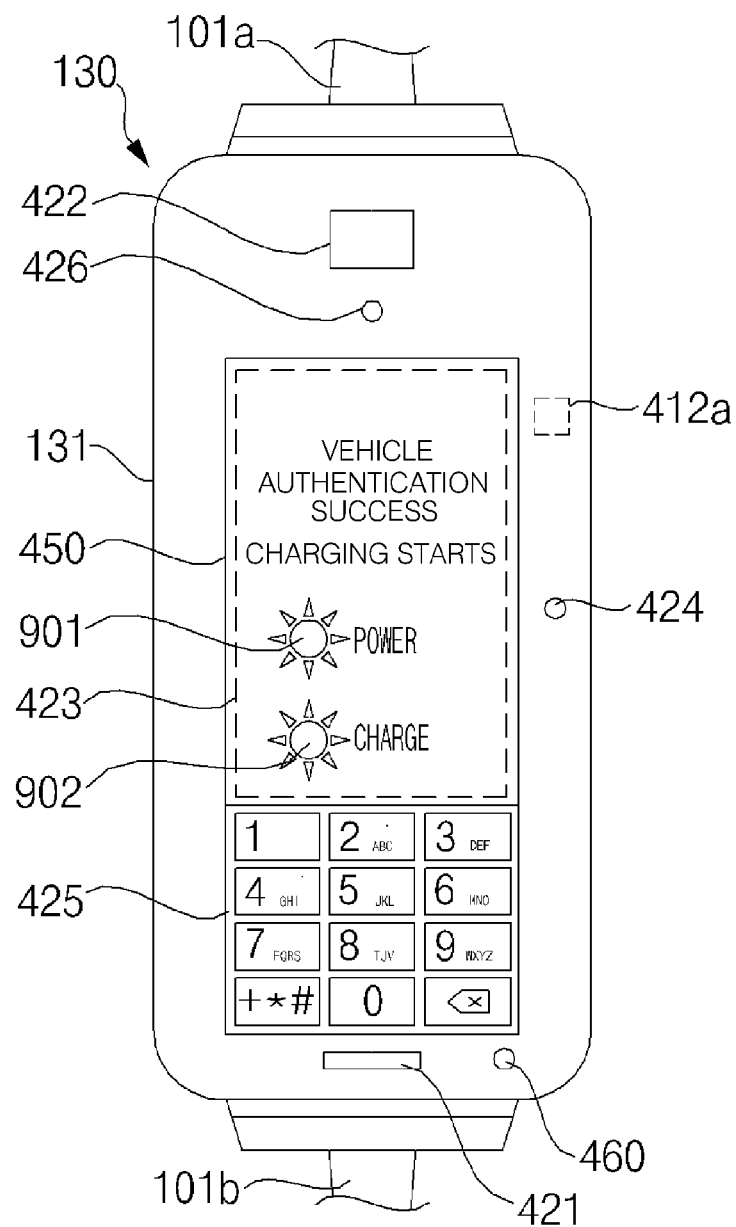

[FIG. 10a]
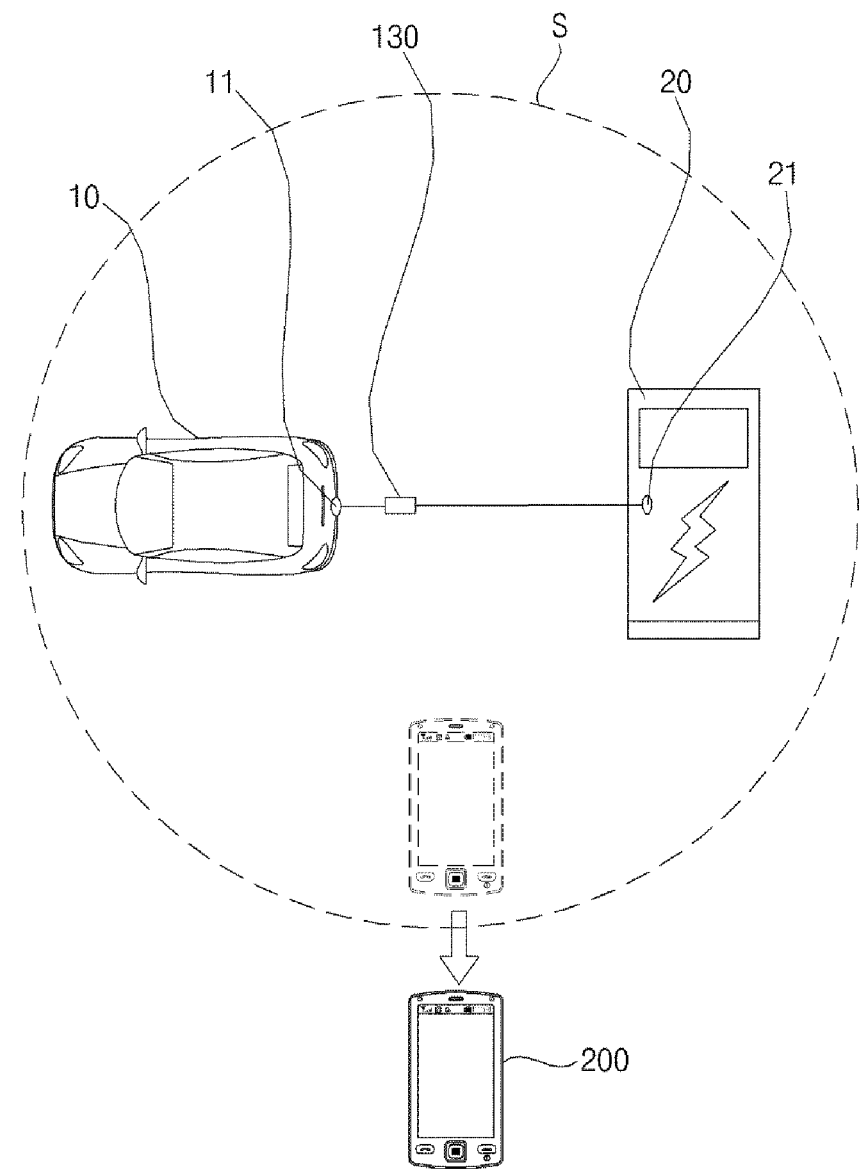

【FIG. 10b】
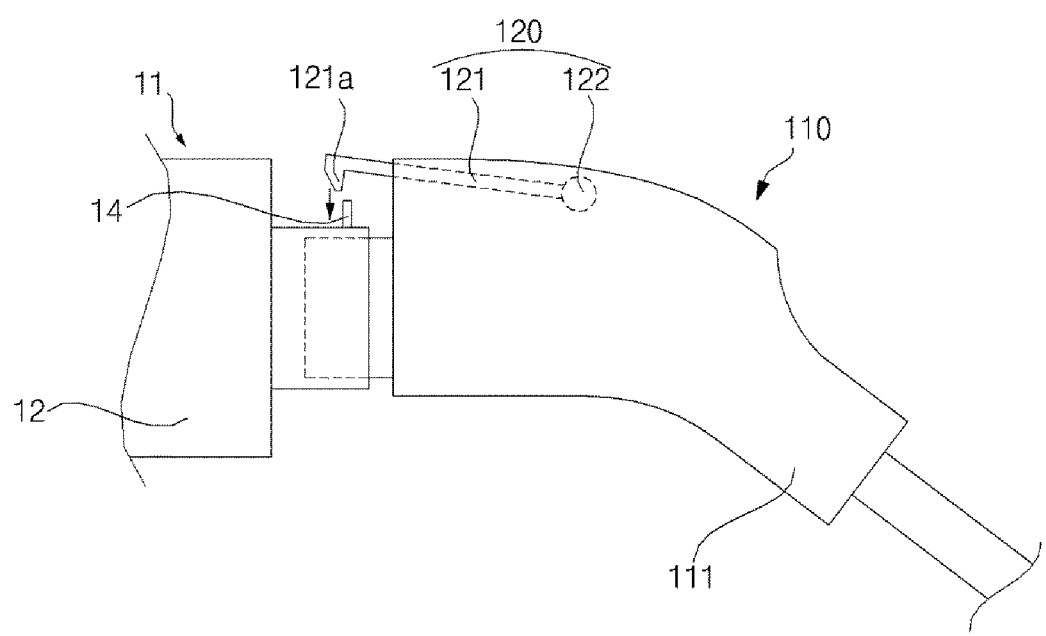

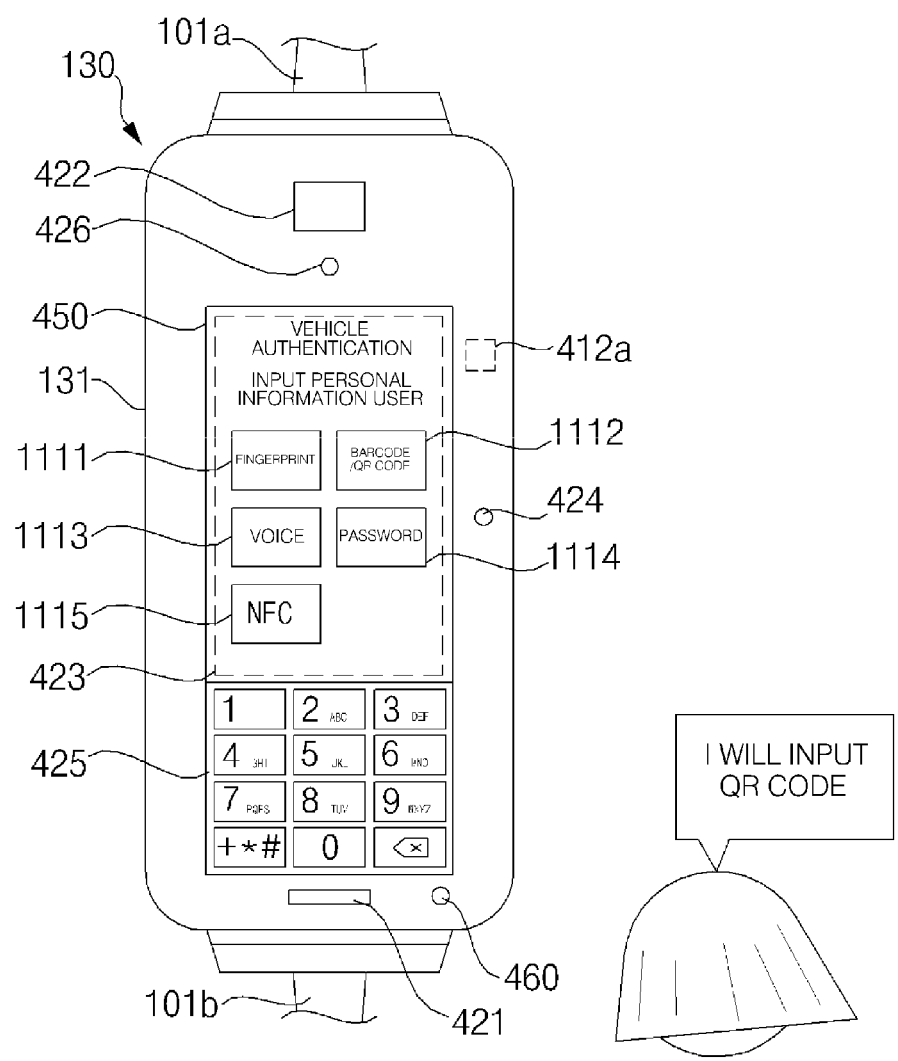
【FIG. 11a】

[FIG. 11b]
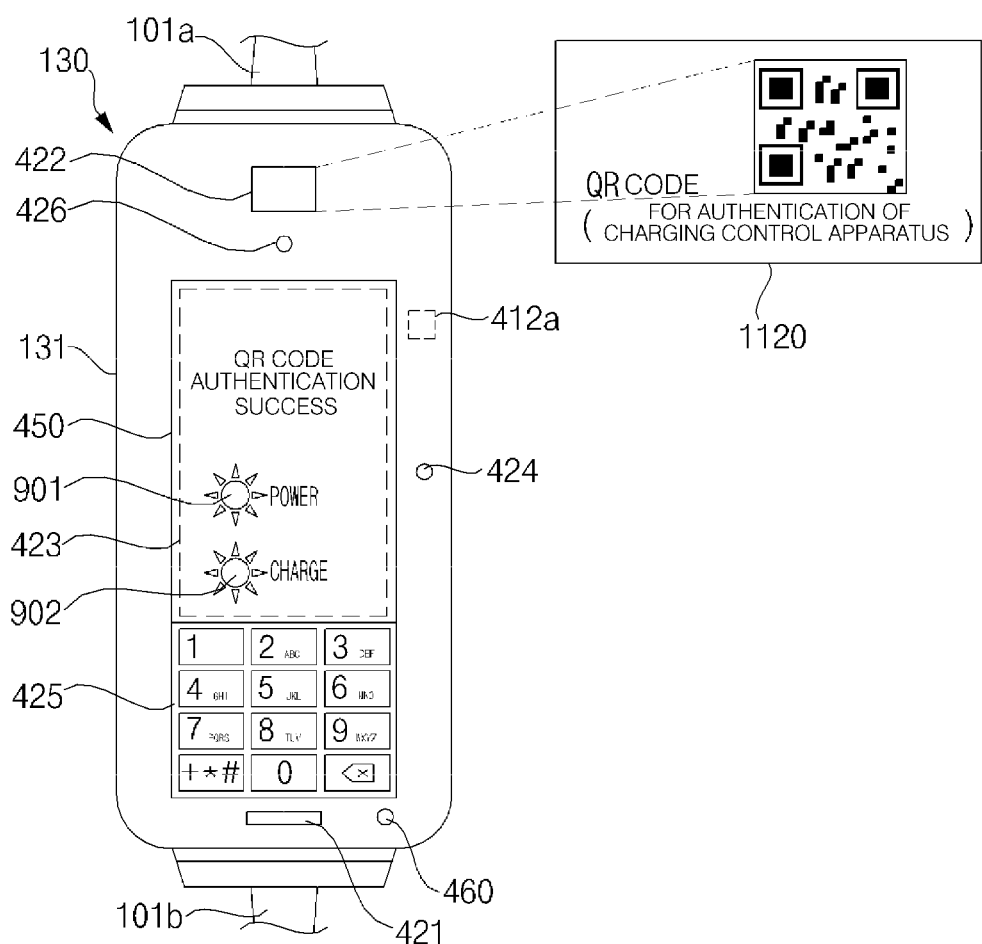

[FIG. 12]
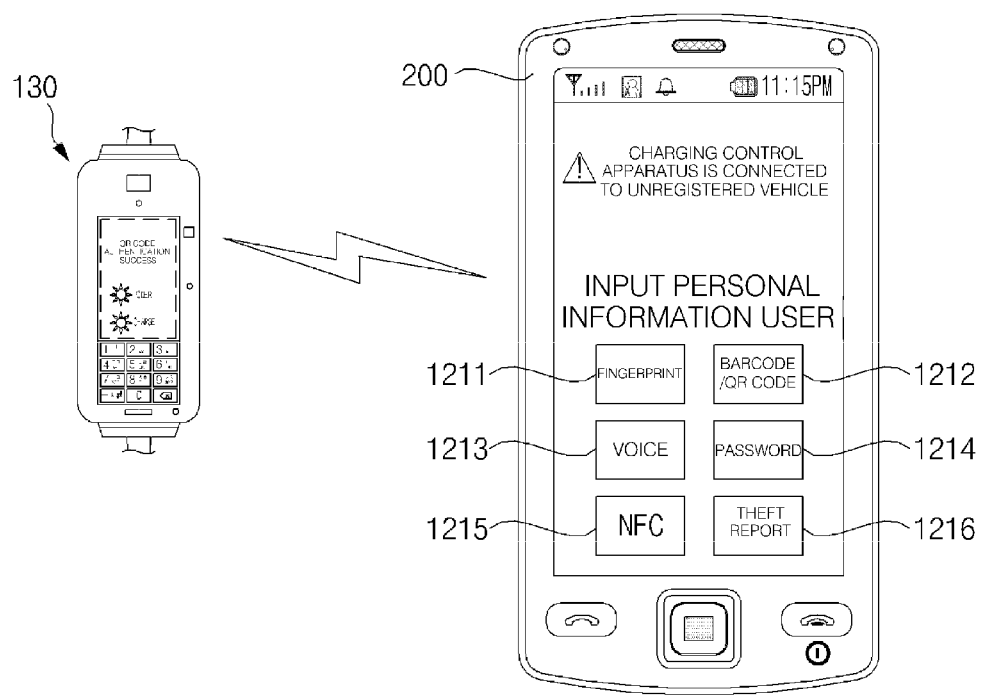

[FIG. 13]
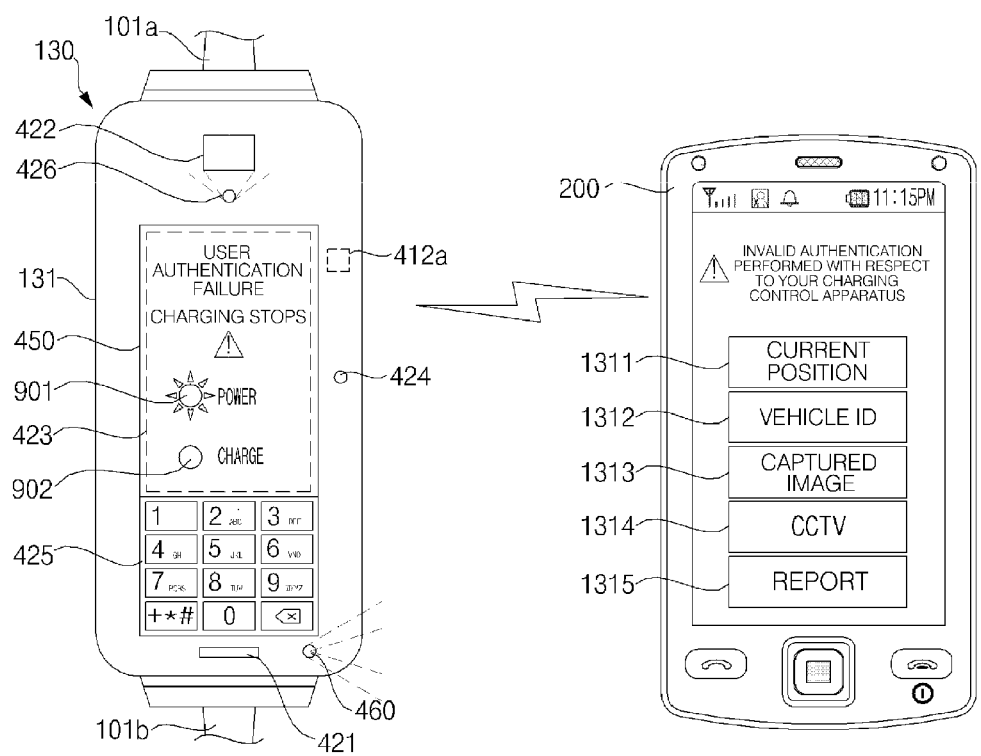

[FIG. 14a]
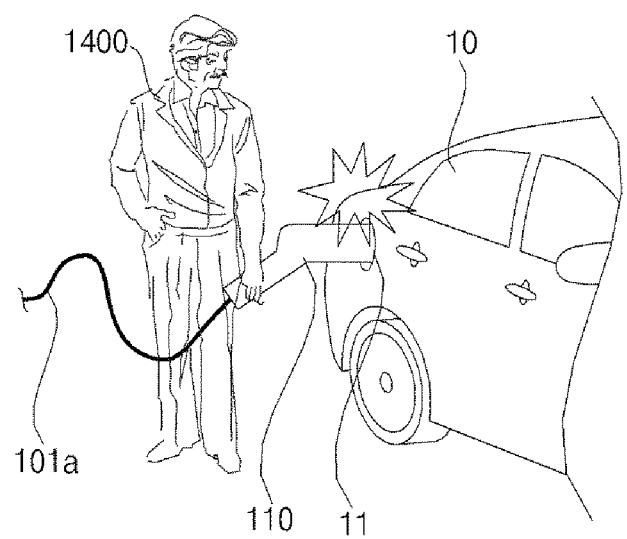

[FIG. 14b]
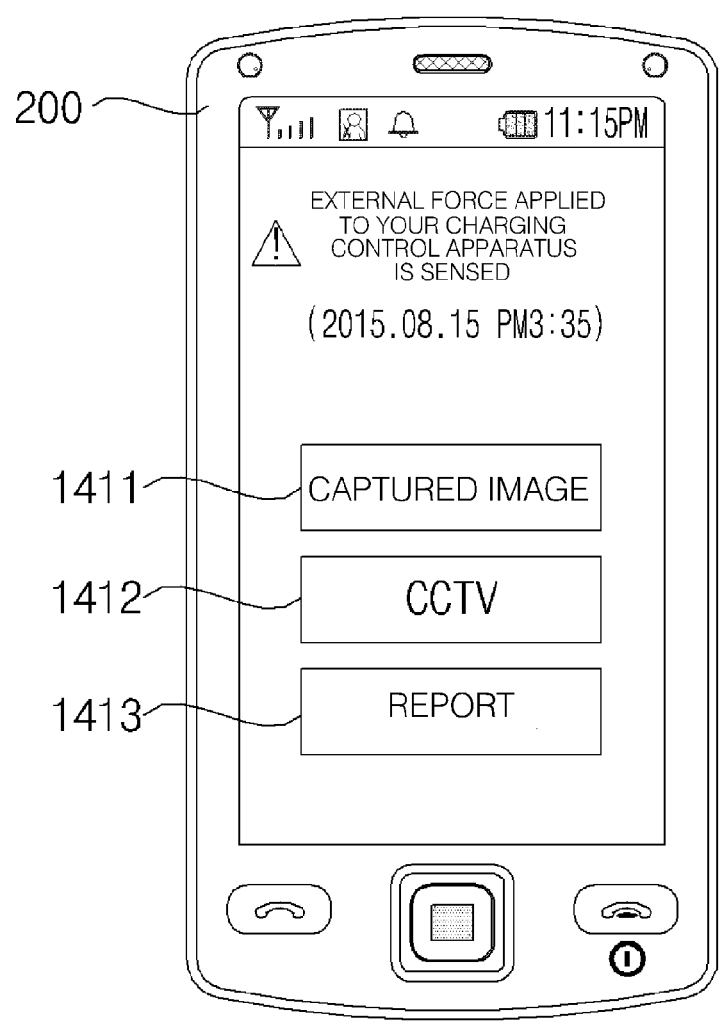

[FIG. 15]
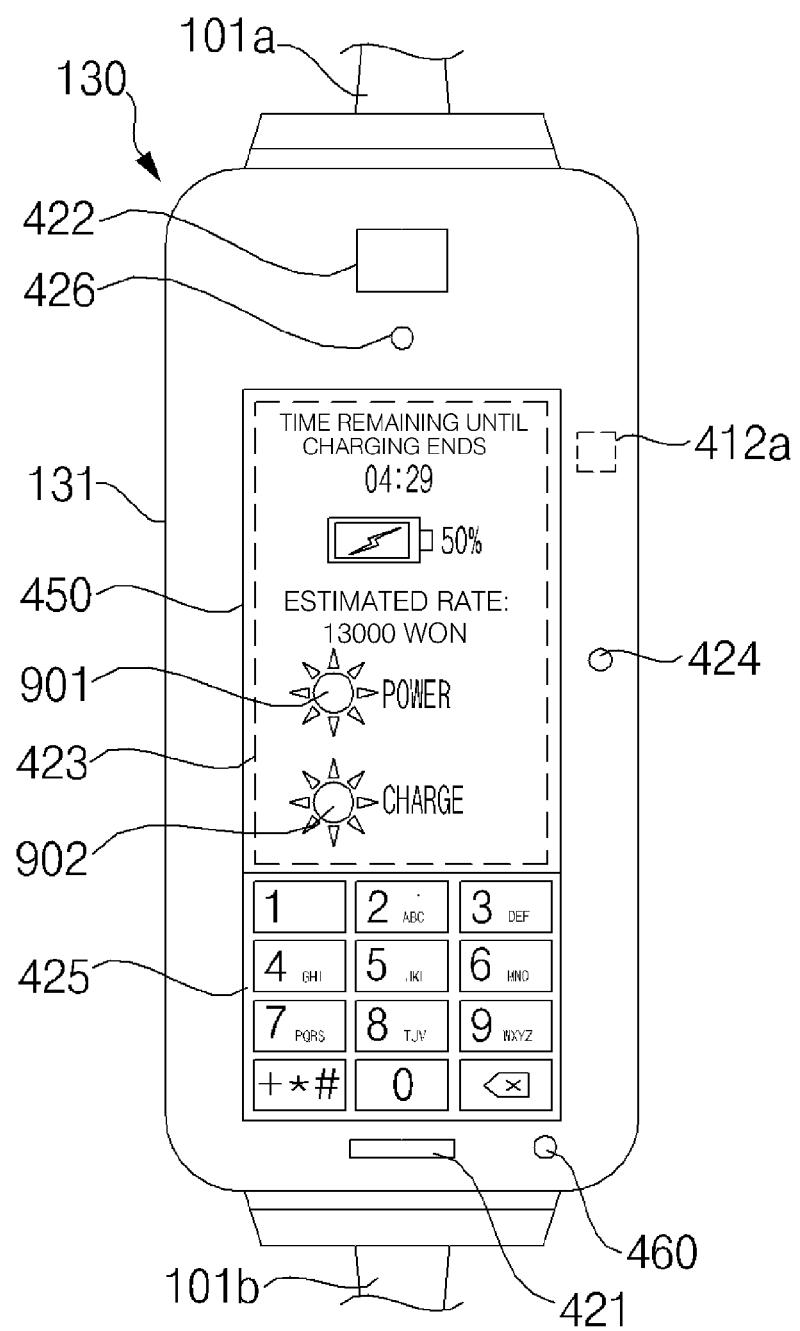

[FIG. 16a]
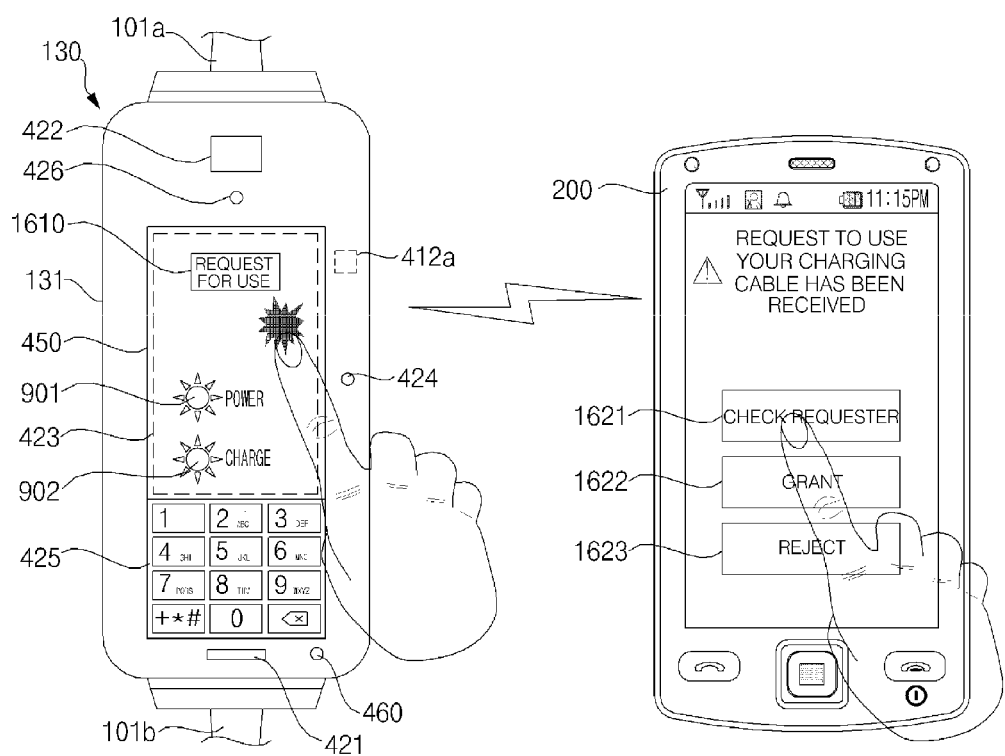

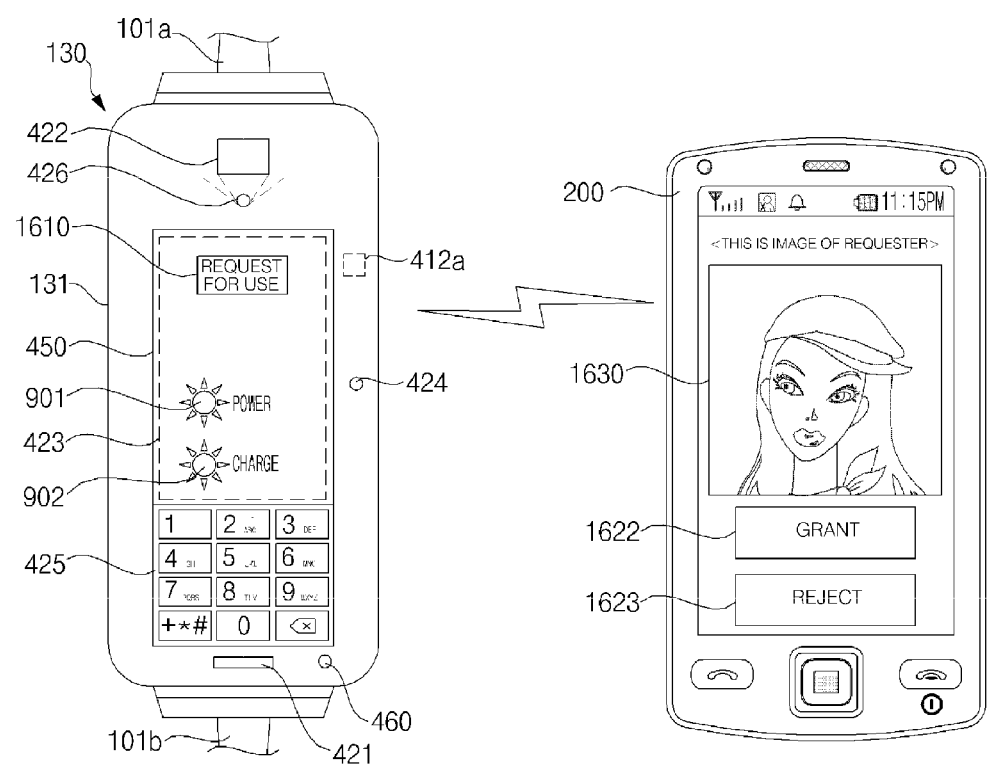
[FIG. 16b]

CHARGING CONTROL APPARATUS AND CONTROL METHOD THEREFOR

CROSS REFERENCE TO RELATED APPLICATIONS

This application is the National Phase of PCT International Application No. PCT/KR2015/009493, filed on Sep. 9, 2015, which claims priority under 35 U.S.C. 119(a) to Patent Application No. 10-2015-0122129, filed in the Republic of Korea on Aug. 28, 2015, all of which are hereby expressly incorporated by reference into the present application.

TECHNICAL FIELD

The present invention relates to a charging control apparatus and a method of controlling the same and, more particularly, to a charging control apparatus for an electric vehicle and a method of controlling the same.

BACKGROUND ART

A vehicle refers to an apparatus for transporting persons or goods from any place to another place by rolling wheels for the purpose of. For example, two-wheeled vehicles such as motorcycles, four-wheeled vehicles such as sedans, and trains are types of vehicles.

An electric vehicle is the most probable alternative for solving automobile pollution and energy problems in the future and thus research thereinto has been actively conducted.

An electric vehicle mainly drives an AC or DC motor using power of a battery to obtain power and is roughly classified into a battery electric vehicle and a hybrid electric vehicle. A battery electric vehicle drives a motor using power of a battery and is recharged when power is exhausted. In contrast, a hybrid electric vehicle drives an engine to generate electricity, charges a battery, and drives an electric motor using electricity, thereby moving a vehicle.

Meanwhile, as electric vehicles have come into widespread use, users may charge a battery provided in a vehicle with electric energy received from a charging station or a house using a portable charging control apparatus.

Meanwhile, the portable charging control apparatus is vulnerable to unrightful use by another person or theft. For example, when a user leaves for a while in a state of connecting a charging control apparatus to an electric vehicle, another person may easily disconnect the charging control apparatus from the vehicle.

DISCLOSURE

Technical Problem

An object of the present invention devised to solve the problem lies in a charging control apparatus capable of preventing unrightful use by another person or theft by fixing the charging control apparatus not to be disconnected from a vehicle upon starting charging.

Another object of the present invention devised to solve the problem lies in a charging control apparatus capable of enabling a user to lock and unlock the charging control apparatus and a vehicle using a portable device thereof at a distant place (e.g., at a position separated from the charging control apparatus by a predetermined distance).

Another object of the present invention devised to solve the problem lies in a charging control apparatus capable of enabling a user to rapidly cope with unrightful use or theft by outputting or transmitting a warning message to a portable device of the user when another person is suspected of unrightful use or theft.

Another object of the present invention devised to solve the problem lies in a charging control apparatus capable of enabling a user located at a distant place to disable operation of the charging control apparatus using a portable device thereof when the charging control apparatus is stolen.

The technical problems solved by the present invention are not limited to the above technical problems and other technical problems which are not described herein will become apparent to those skilled in the art from the following description.

Technical Solution

The object of the present invention can be achieved by providing a charging control apparatus including a communication unit for wirelessly communicating with at least one communication apparatus including a vehicle, a charging connector electrically connected to a charging inlet provided in the vehicle, a locking unit provided in the charging connector to lock or unlock the charging connector and the charging inlet, and a controller for checking whether an ID of the vehicle received by the communication unit is included in a pre-stored authentication information list in response to electrical connection between the charging connector and the charging inlet, determining whether the charging connector and the charging inlet are unlocked according to a position of a pre-authenticated portable device when the ID of the vehicle is included in the pre-stored authentication information list, and controlling the locking unit according to the determination.

The controller may determine whether the charging connector and the charging inlet are unlocked according to the position of the portable device, when the ID of the portable device received by the communication unit is included in the authentication information list.

The controller may determine whether the portable device is located within a predetermined distance from the charging control apparatus, based on a signal intensity of a wireless signal received from the portable device by the communication unit.

The controller may determine whether the portable device is located within a predetermined distance from the charging control apparatus based on GPS coordinates of the portable device received from the portable device.

The controller may control the locking unit to lock the charging connector and the charging inlet, when the portable device is located beyond a predetermined distance from the charging control apparatus.

The controller may control the locking unit to unlock the charging connector and the charging inlet, when the portable device is located within a predetermined distance from the charging control apparatus.

The charging control apparatus may further include at least one of a fingerprint scanner, a barcode/QR code scanner, a touch sensor, a microphone, a keypad and a camera.

The charging control apparatus may further include a display unit for displaying information, and the controller may control the display unit to display a screen for requesting to input at least one piece of user authentication information included in the authentication information through the input unit, when the ID of the vehicle is not included in the authentication information list.

The controller may determine whether the charging connector and the charging inlet are unlocked according to the position of the portable device, when the user authentication information received by the input unit is included in the authentication information list.

The controller may control the communication unit to request at least one piece of user authentication information included in the authentication information list from the portable device, when the ID of the vehicle is not included in the authentication information list.

The controller may determine whether the charging connector and the charging inlet are unlocked according to the position of the portable device, when the user authentication information transmitted from the portable device and received by the communication unit in response to the request is included in the authentication information list.

The user authentication information may include at least one of a fingerprint, a barcode, a QR code, voice, a password and an ID of an NFC tag.

The controller may perform predetermined operation when the received user authentication information is not included in the authentication information list.

The operation may include (i) warning message output, (ii) electrical disconnection between the charging connector and a power supply and (ii) transmission of a notification to the portable device, and the notification may include at least one of (i) the ID of the vehicle, (ii) an image received from a camera included in the input unit, (iii) a position of the charging control apparatus and (iv) CCTV information within a predetermined distance from the position of the charging control apparatus.

The charging control apparatus may further include an alarm sensor for detecting external force applied to the charging control apparatus, and the controller may perform predetermined operation when the external force exceeds a predetermined threshold in a state in which the charging connector and the charging inlet are locked by the locking unit.

The operation may include (i) warning message output, (ii) electrical disconnection between the charging connector and a power supply and (ii) transmission of a notification to the portable device, and the notification may include at least one of (i) a time when the external force is sensed, (ii) an image received from a camera included in the input unit and (iii) CCTV information within a predetermined distance from the position of the charging control apparatus.

The controller may unlock the charging connector and the charging inlet based on a command received from the portable device by the communication unit, in a state of locking the charging connector and the charging inlet.

The controller may control the display unit to display information related to at least one of the vehicle and the charging control apparatus.

When a request for use is received from another person by the input unit, the controller may control the communication unit to transmit, to the portable device, information indicating that a request for use has been received.

The charging control apparatus may further include a plug connected to a power supply for supplying electric energy and a switching unit for electrically connecting or disconnecting the charging connector to or from the power supply according to a command received from the controller.

Details of the other embodiments are included in the detailed description and the figures.

Advantageous Effects

The vehicle and the method of controlling the same according to the present invention include one or more of the following effects.

According to at least one of the embodiments of the present invention, it is possible to prevent unrightful use by another person or theft by fixing the charging control apparatus not to be disconnected from a vehicle upon starting charging. In particular, since the charging control apparatus and the vehicle are automatically locked or unlocked according to the position of the portable device of the user, user convenience increases.

In addition, in the present invention, a user can lock and unlock the charging control apparatus and the vehicle using a portable device thereof at a distant place (e.g., at a position separated from the charging control apparatus by a predetermined distance). Therefore, when another person requests to use the charging control apparatus, it is possible to remotely control locking between the charging control apparatus and the vehicle, thereby increasing user convenience.

In the present invention, when another person is suspected of unrightful use or theft, a warning message is output or transmitted to a portable device of the user, such that the user can rapidly cope with unrightful use or theft.

In the present invention, the user located at a distant place can disable operation of the charging control apparatus using a portable device thereof. Therefore, when the charging control apparatus is stolen, another person cannot charge the battery of any vehicle using the charging control apparatus.

The effects which can be obtained by the present invention are not limited to the above-described effects and other effects which are not described herein will become apparent to those skilled in the art from the following description.

DESCRIPTION OF DRAWINGS

FIG. 1 is a diagram showing an exemplary situation in which a charging control apparatus according to an embodiment of the present invention is connected between a vehicle and a power source.

FIG. 2 is a perspective view of a charging connector and a charging inlet provided in a charging control apparatus according to an embodiment of the present invention.

FIG. 3 is a diagram showing a state in which a main body of the charging connector shown in FIG. 2 is inserted into a main body of the charging inlet.

FIG. 4 is an exemplary block diagram of a charging control apparatus according to an embodiment of the present invention.

FIG. 5 is a flowchart illustrating an exemplary process executed by a charging control apparatus according to an embodiment of the present invention.

FIG. 6 is a flowchart illustrating an exemplary process executed by a charging control apparatus according to an embodiment of the present invention.

FIG. 7 is a flowchart illustrating an exemplary process executed by a charging control apparatus according to an embodiment of the present invention.

FIG. 8 is a flowchart illustrating an exemplary process executed by a charging control apparatus according to an embodiment of the present invention.

FIGS. 9a and 9b are diagrams showing an exemplary operation performed when a charging control apparatus according to an embodiment of the present invention authenticates a vehicle.

FIGS. 10a and 10b are diagrams showing an exemplary operation performed when a charging control apparatus according to an embodiment of the present invention is locked to a charging inlet provided in a vehicle according to the position of the portable device of a user.

FIGS. 11a and 11b are diagrams showing an exemplary operation performed when a charging control apparatus according to an embodiment of the present invention authenticates a user.

FIG. 12 is a diagram showing an exemplary operation performed when a charging control apparatus according to an embodiment of the present invention authenticates a user.

FIG. 13 is a diagram showing an exemplary operation performed when a charging control apparatus according to an embodiment of the present invention fails to authenticate a vehicle and a user.

FIGS. 14a and 14b are diagrams showing an exemplary operation performed when external force is applied to a charging control apparatus according to an embodiment of the present invention.

FIG. 15 is a diagram showing an exemplary operation performed by a charging control apparatus according to an embodiment of the present invention.

FIGS. 16a and 16b are diagrams showing an exemplary operation performed by a charging control apparatus according to an embodiment of the present invention.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc. may be used herein to describe various elements of the present invention, these terms are only used to distinguish one element from another element and order, or sequence of corresponding elements are not limited by these terms.

It will be understood that when an element is referred to as being "connected to" another element, the element can be directly connected to the other element or intervening elements may also be present. In contrast, when an element is referred to as being "directly connected to" another element, there are no intervening elements present. In addition, a certain element "controlling" another element includes not only the certain element directly controlling another element but also the certain element controlling another element through intervening elements. In addition, a certain element "providing" information or a signal to another element includes not only the certain element directly providing information or a signal to another element but also the certain element providing information or a signal to another element through intervening elements.

A singular representation may include a plural representation unless context clearly indicates otherwise.

It will be further understood that, in this specification, the terms "includes" and/or "has", specify the presence of stated elements, steps, operations, components, parts or a combination thereof, but do not preclude the presence or addition of one or more other elements, steps, operations, components, parts or a combination thereof.

FIG. 1 is a diagram showing an exemplary situation in which a charging control apparatus 100 according to an embodiment of the present invention is connected between a vehicle 10 and a power supply 20.

Referring to FIG. 1, the vehicle 20 is an electric vehicle. For example, the vehicle 10 may be a plug-in hybrid electric vehicle, a battery electric vehicle or a neighborhood electric vehicle. The vehicle 10 is driven using a battery and an electric motor. The vehicle 10 is different from a general vehicle using only fuel such as gasoline in that a motor is driven using electricity stored in the battery. In addition, if the remaining amount of the battery of the vehicle 10 is insufficient, the battery may be charged using various charging methods such as (i) slow charging, (ii) rapid charging and (iii) emergency charging. The battery of the vehicle 10 may include a driving battery and an auxiliary battery. The driving battery may provide electric energy required to move the vehicle 10 from any place to another place and the auxiliary battery may provide electric energy required to operate lights, a wiper and an audio system. As the driving battery, for example, lithium-ion polymer battery may be used.

To this end, means for receiving electric energy, that is, a charging inlet 11, is provided at one side of the vehicle 10.

The charging control apparatus 100 may include a charging connector 110, a plug 120, a control box 130 and a cable 101. The charging inlet 11 is connected to the charging connector 110 of the charging control apparatus 100 as shown in the figure. The plug 120 of the charging control apparatus 100 is connected to the power supply 20. For example, the plug 120 of the charging control apparatus 100 may be electrically connected to a charging outlet 21 provided in a home power supply or a power supply of a charging station.

If the charging connector 110 of the charging control apparatus 100 is connected to the charging inlet 11 of the vehicle 10 and the plug 20 is connected to the charging outlet 21 of the power supply 20, the battery of the vehicle 10 may be charged with electric energy received from the power supply 20.

Meanwhile, the control box 130 may be connected between the charging connector 110 of the charging control apparatus 100 and the plug 120. Specifically, the control box 130 may be connected to the charging connector 110 and the plug 120 through the cable 101. The cable 101 may include a first cable 101a and a second cable 101b. Specifically, as shown in the figure, the control box 130 is connected to the charging connector 110 through the first cable 101a and is connected to the plug 120 through the second cable 101b. To this end, electric energy received from the power supply 20 may be supplied to the vehicle 10 by sequentially passing through the plug 120, the second cable 101b, the control box 130, the first cable 101a and the charging connector 110.

Meanwhile, the control box 130 may be configured to be electrically connected to or disconnected from the first cable 101a and the second cable 101b according to a predetermined rule.

Meanwhile, since it takes a certain time to complete charging of the vehicle, if the user of the charging control apparatus 100 leaves for a while, the charging control apparatus 100 is likely to be stolen. In addition, when the charging connector 110 is disconnected from the charging inlet 11 by external force applied by a person or an object, charging of the vehicle 10 cannot be normally performed and the vehicle may be damaged. Therefore, the present invention proposes the charging control apparatus 100 capable of safely locking the vehicle 10 and the charging control apparatus 100 and, more specifically, the charging inlet 11 and the charging connector 110.

FIG. 2 is a perspective view of the charging connector 110 and the charging inlet 11 provided in the charging control apparatus 100 according to an embodiment of the present invention. In addition, FIG. 3 is a diagram showing a state in which a main body 110 of the charging connector 110 shown in FIG. 2 is inserted into a main body 12 of the charging inlet 11.

Referring to FIGS. 2 and 3, the charging connector 110 may include a main body 111, a plurality of connection pins 112a to 112e and a locking part 120. Specifically, the locking part 120 may include a locking bar 121 and a locking driving module 122. In one embodiment, the locking bar 121 is coupled to the locking driving module 122 to rotate clockwise or counterclockwise or to move upward or downward according to driving of the locking driving module 122.

The plurality of connection pins 112a to 112e may be classified according to functions thereof. For example, each of the plurality of connection pins 112a to 112e may perform any one of a power supply connection function, a communication function and a ground connection function. Although only five connection pins 112a to 112e are shown in FIG. 2, the present invention is not limited thereto and more or fewer pins may be included in the charging connector 110. The number, positions and usage of connection pins included in the charging connector 110 may be determined according to the international standard known by the International Electrotechnical Committee, for example.

When the main body 111 of the charging connector 110 is inserted into and is physically connected to the main body 12 of the charging inlet 11 at a predetermined position and area, the connection pins 112a to 112e may be electrically connected to connection terminals respectively provided in a plurality of insert holes 13a to 13e formed in the charging inlet 11. In this case, as shown in the figure, the number of connection pins 112a to 112e may be equal to the number of insert holes 13a to 13e.

Meanwhile, a locking latch 14 may be formed at one side of the main body 12 of the charging inlet 11. Specifically, when a part of the main body 111 of the charging connector 110 is normally inserted into an insertion groove provided in the main body 12 of the charging inlet 11, a part of the front end of the locking latch 14 is disposed in a vertical direction of the locking bar 121. In this state, when the locking bar 121 moves downward by the locking driving module 122, a projection 121a formed at an end of the locking bar 121 meets the locking latch 14, such that the charging connector 110 and the charging inlet 11 are stably fastened. That is, the charging connector 110 and the charging inlet 11 may be locked not to be disconnected from each other.

Referring to FIG. 3, when one side of the main body 111 of the charging connector 110 is normally inserted into the groove formed in the main body 12 of the charging inlet 11, the projection 121a formed on one side of the locking bar 121 may be located closer to the main body 12 of the charging inlet 11 than the locking latch 14. The other side of the locking bar 121 may be coupled to the locking driving module 122. In one embodiment, the locking driving module 122 may include a motor. When the locking bar 121 rotates in the counterclockwise direction by driving of the locking driving module 122, the projection 121a may meet the inner side surface of the locking latch 14. Therefore, unless the locking bar 121 rotates in the clockwise direction by driving of the locking driving module 122, the state in which the main body 111 of the charging connector 110 is inserted into the insertion groove formed in the main body 12 of the charging inlet 11 may be stably maintained.

Meanwhile, the locking method shown in FIG. 3 is merely exemplary. Accordingly, using at least one of various well-known locking methods, the charging inlet 11 and the charging connector 110 may be locked or unlocked.

FIG. 4 is an exemplary block diagram of a charging control apparatus 100 according to an embodiment of the present invention.

Referring to FIG. 4, the charging control apparatus 100 may include a communication unit 410, an input unit 420, a memory 430, an alarm sensor 440, a display unit 450, a sound output unit 460, a switching unit 470, an interface 480, a controller 490, a power supply 20 unit 495 and a lock driving module 122. The charging control apparatus 100 may include greater or fewer components than the components shown in FIG. 4, in some embodiments.

The communication unit 410 communicates with at least one communication device by wire and/or wirelessly. The communication unit may include one or more modules facilitating wired and/or wireless communication between the charging control apparatus 100 and a vehicle 10, between the charging control apparatus 100 and a wireless communication system, between the charging control apparatus 100 and another charging control apparatus 100, between the charging control apparatus 100 and an external server, or between the charging control apparatus 100 and a portable device.

The wireless Internet module 411 is configured to facilitate wireless Internet access. This module may be mounted inside or outside the charging control apparatus 100. The wireless Internet module 411 may transmit and/or receive wireless signals via communication networks according to wireless Internet technologies.

Examples of such wireless Internet access include Wireless LAN (WLAN), Wi-Fi (Wireless Fidelity), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 411 may transmit/receive data according to one or more of such wireless Internet technologies, and other Internet technologies as well.

The short-range communication module 412 is configured to facilitate short-range communication and to support short-range communication using Bluetooth™, Radio Frequency IDentification (RFID), Infrared Data Association (IrDA), Ultra-WideBand (UWB), ZigBee, Near Field Communication (NFC), Wi-Fi (Wireless Fidelity), Wi-Fi Direct, Wireless USB (Wireless Universal Serial Bus), and the like. The short-range communication module 412 generally supports wireless communication between the charging control apparatus 100 and a wireless communication system, between the charging control apparatus 100 and another charging control apparatus 100, between the charging control apparatus 100 and a portable device, between the charging control apparatus 100 and the vehicle 10 or between the charging control apparatus 100 and an external server, via wireless area networks. One example of the wireless area networks is a wireless personal area network.

The portable device may be a smartphone or a wearable device (e.g., smartwatch or smart glasses) capable of exchanging data with the charging control apparatus 100. The short-range communication module 412 may detect a portable device capable of performing communication with the charging control apparatus 100 in the vicinity of the charging control apparatus 100. In addition, when the detected wearable device is a device authenticated to communicate with the charging control apparatus 100 or the device of an authenticated user (e.g., an owner of the charging control apparatus 100), the charging control apparatus 100 may transmit at least a part of data processed in the charging control apparatus 100 to the portable device via the short-range communication module 412. Hence, a user of the portable device may receive, check, transmit or store the data processed in the charging control apparatus 100 through the portable device. For example, when external force (e.g., impact occurring due to theft) applied to the charging control apparatus 100 is sensed, the user may activate at least one function of the charging control apparatus 100 or deactivate the other functions of the charging control apparatus.

The location information module 413 is generally configured to acquire the position (or the current position) of the charging control apparatus 100. As an example, the location information module 413 includes a Global Position System (GPS) module or a Wi-Fi module. As one example, when the charging control apparatus 100 uses a GPS module, the position of the charging control apparatus 100 may be acquired using a signal sent from a GPS satellite. As another example, the charging control apparatus 100 may acquire information related to the position of the charging control apparatus 100 based on information related to a wireless access point (AP) which transmits or receives a wireless signal to or from the Wi-Fi module. The location information module is not limited to the module for directly calculating or acquiring the position of the charging control apparatus 100.

The wired communication module 414 supports wired communication between the charging control apparatus 100 and a portable device or between the charging control apparatus 100 and the vehicle 10. The wired communication module 414 may be located inside or outside the charging control apparatus 100.

Next, the input unit 420 is used to input information on a user or a surrounding environment, such as fingerprint information, video information (or signal), audio information (or signal), barcode/QR code information, touch information, etc.

In order to input the fingerprint information, the charging control apparatus 100 may include a scanner.

In order to input the barcode/QR code information, the charging control apparatus 100 may include a barcode/QR code scanner 422.

In order to input touch information, the charging control apparatus 100 may include a touch sensor 423. The touch sensor 423 can sense touch input applied by a user using any of a variety of touch methods such as resistive, capacitive, infrared, ultrasonic and magnetic field methods. As one example, the touch sensor 423 may be configured to convert changes in pressure applied to a specific part of the touch sensor 423 or convert change in capacitance occurring at a specific part of the touch sensor into electrical input signals. The touch sensor 423 may also be configured to sense not only a touched position and a touched area, but also touch pressure and/or touch capacitance of a touch object. Letters, numbers or menu items indicated or specified in various modes are input using the touch method. The touch object is generally used to apply touch input to the touch sensor 423. Examples of typical touch objects include a finger, a touch pen, a stylus, a pointer, or the like. Meanwhile, the touch sensor 423 may have an inter-layered structure or an integrated structure with the display unit 450 in order to realize a touchscreen.

The microphone 424 converts an external acoustic signal into electrical audio data. The processed audio data may be variously used according to function (application program) executed in the charging control apparatus 100. If desired, the microphone 424 may include various noise removal algorithms to remove unwanted noise generated in the process of receiving the external acoustic signal.

The keypad 425 includes at least one physical button. Each physical button may be related to at least one of numbers, letters, symbols or functions.

In order to input the video information, the charging control apparatus 100 may include a camera 426. Images generated by the camera 426 may be displayed on the display unit 450, stored in the memory 430 or transmitted to an external device (e.g., portable device).

The memory 430 stores data supporting the various functions of the charging control apparatus 100. The memory 430 may store data and commands for operation of the charging control apparatus 100 or a plurality of application programs or applications executed in the charging control apparatus 100. At least some of the application programs may be downloaded from an external server through wireless communication. In addition, at least some of the application programs may be present in the charging control apparatus 100 upon release. Meanwhile, the application programs may be stored in the memory 430 and installed in the charging control apparatus 100 to be executed to perform operation (or function) of the charging control apparatus 100 by the controller 490.

In addition, the memory 430 may store an authentication information list. At least one piece of authentication information included in the authentication information list may be registered by the user with the memory 430 using the input unit 420 or the communication unit 410. The controller 490 may start charging of the vehicle 10 when information received by the input unit 420 or the communication unit 410 is included in the authentication information list. The authentication information included in the authentication information list may identify at least one of the vehicle 10 and the user. For example, in order to check whether the vehicle 10 may rightfully use the charging control apparatus 100, the ID of the vehicle 10 may be included in the authentication information list. As another example, in order for the user who manipulates the charging control apparatus 100 to authenticate the rightful vehicle 10 which may use the charging control apparatus 100, the fingerprint, voice, password, barcode, QR code and the ID of an NFC tag of each user may be included in the authentication information list. For example, if the password received by the input unit 420 is not equal to any password included in the authentication information list, the controller 490 may determine whether a person who currently manipulates the charging control apparatus 100 is not a rightful user and activate or deactivate a specific function.

The alarm sensor 440 may include an impact sensor 441 and a motion sensor 442. The impact sensor 441 senses external force applied to the charging control apparatus 100 and, more particularly, to the charging connector 110. In one embodiment, the impact sensor 441 may be activated under a specific condition (e.g., locking) to sense external force and to provide a signal indicating that the sensed external force exceeds a predetermined threshold to the controller 490. The motion sensor 442 senses motion of the charging control apparatus 100 and, more particularly, the charging connector 110. In one embodiment, the motion sensor 442 may be activated under a specific condition (e.g., locking) to sense motion of the charging control apparatus 100 and to provide a signal indicating that the magnitude of the sensed motion exceeds a predetermined threshold to the controller 490.

For example, if another person pulls the charging control apparatus 100 in order to steal the charging control apparatus 100 in a state in which the charging connector 110 and the charging inlet 11 are locked, impact applied to the charging control apparatus 100 or motion of the charging control apparatus 100 may be sensed by the alarm sensor 440. The controller 490 may perform predetermined operation such as warning message output in response to a signal received from the alarm sensor 440.

The display unit 450 displays information processed in the charging control apparatus 100. For example, the display unit 450 may display execution screen information of an application program executed in the charging control apparatus 100 or user interface (UI) or graphical user interface (GUI) information according to the execution screen information. In addition, the display unit 450 may display a screen for requesting input of authentication information for checking whether the user is a rightful user who rightfully uses the charging control apparatus 100. In addition, the display unit 450 may display information related to the vehicle 10 connected to the charging connector 110 (e.g., the remaining amount of the battery and the vehicle 10 number). In addition, the display unit 450 may display information related to the portable device searched for by the communication unit 410 and authenticated by the controller 490.

The display unit 450 may include at least one of a Liquid Crystal Display (LCD), a Thin-Film LCD (TF LCD), an Organic Light Emitting Diode (OLED) display, a flexible display, a 3D display, and an e-ink display.

The sound output unit 460 may output audio data received from the wireless communication unit 410 or stored in the memory 430. For example, when external force exceeding the threshold is sensed by the impact sensor 441, the sound output unit 460 may output a warning sound. As another example, the sound output unit 460 may output user voice received from the portable device through the communication unit 410. The sound output unit 460 may output a sound signal related to the function (e.g., charging of the vehicle 10, entry into an antitheft mode, etc.) performed by the charging control apparatus 100. The sound output unit 460 may include a speaker, a buzzer, etc.

The switching unit 470 electrically connects or disconnects the charging connector 110 to or from the plug 120. The switching unit 470 may include any unit (e.g., a relay, a transistor or a diode) capable of changing the electrical connection between two or more components in response to an electrical signal.

The interface 480 detects electrical connection between the charging connector 110 and/or the plug 120. Specifically, the interface 480 provides a specific signal to the controller 490 depending on whether the charging connector 110 and the charging inlet 11 are electrically connected. Therefore, the controller 490 may determine whether the charging connector 110 and the charging inlet 11 are electrically connected or disconnected. In addition, a specific signal is provided to the controller 490 depending on whether the plug 120 and the power supply 20 are electrically connected. Therefore, the controller 490 may determine whether the plug 120 and the power supply 20 are electrically connected or disconnected. The controller 490 may determine whether the battery of the vehicle 10 may be charged with electric energy of the power supply 20 based on the signal received from the interface 480.

The controller 490 controls overall operation of the charging control apparatus 100. The controller 490 may process signals, data, information, etc. input or output through the above-described components or execute the application program stored in the memory 430, thereby processing or providing appropriate information or functions to the user.

In addition, the controller 490 may control at least some of the components described with reference to FIG. 4 in order to execute the application program stored in the memory 430. Further, the controller 490 may operate at least two of the components included in the charging control apparatus 100 in order to execute the application program. For example, the controller 490 may perform or release a function for restricting input of the user for applications when the state of the charging control apparatus 100 satisfies a predetermined condition.

In addition, the controller 490 may perform a pattern recognition process of recognizing handwriting or drawing input received by the touch sensor 423 as letters and images.

In addition, the controller 490 may perform authentication of the vehicle 10, the portable device and the user based on information received by the input unit 420 or the communication unit 410. In one embodiment, the controller 490 may recognize and compare a barcode and/or QR code read by the barcode/QR code scanner 422 with authentication information included in the authentication information list stored in the memory 430. In one embodiment, the controller 490 may recognize and compare voice received by the microphone 424 with authentication information included in the authentication information list stored in the memory 430. In one embodiment, the controller 490 may compare the password received by the keypad 425 with the authentication information included in the authentication information list stored in the memory 430. In one embodiment, the controller 490 may compare the fingerprint information received by the fingerprint scanner 421 with authentication information included in the authentication information list stored in the memory 430. In one embodiment, the controller 490 may compare the vehicle ID received by the communication unit 410 or the connection pin (see FIG. 2) with the authentication information included in the authentication information list stored in the memory 430. In one embodiment, the controller 490 may compare the ID of the portable device and/or the ID of the NFC tag received by the communication unit 410 with authentication information included in the authentication information list stored in the memory 430. According to the result of comparison, the controller 490 may perform or block at least one function of the charging control apparatus 100.

The power supply 20 unit 495 supplies power 20 necessary for operation of the components described with reference to FIG. 4, under control of the controller 490. The power supply 20 unit 495 includes a battery. The battery may include an integral and/or detachable battery capable of being recharged. In addition, the power supply 20 unit 495 may include a connection port and the connection port may be electrically connected to an external charger for supplying electric energy in order to recharge the battery.

The locking driving module is mounted in the charging connector 110 and is functionally coupled to the control box 130. The locking driving module includes at least one motor. In one embodiment, the locking driving module is physically connected to one side of the locking bar 121a with a gear assembly interposed therebetween. Driving force of the locking driving module is provided to the locking bar 121a through the gear assembly, such that the charging connector 110 and the charging inlet 11 are locked or unlocked by the locking bar 121a, as described above with reference to FIGS. 2 and 3. Hereinafter, detailed operation of the charging control apparatus 100 will be described with reference to FIGS. 5 to 16.

FIG. 5 is a flowchart illustrating an exemplary process 500 executed by the charging control apparatus 100 according to an embodiment of the present invention.

In step S550, the charging control apparatus 100 detects electrical connection between the charging connector 110 and the charging inlet 11. In one embodiment, the interface 480 may detect change in current and/or voltage by electrical connection between a specific connection pin provided in the charging connector 110 and a connection terminal provided in the charging inlet 11 and provide a signal corresponding to the detected change in current and/or voltage to the controller 490. The controller 490 may detect electrical connection between the charging connector 110 and the charging inlet 11 based on the signal received from the interface 480. Meanwhile, the controller 490 may detect electrical connection between the plug 120 and the charging outlet 21.

In step S520, the charging control apparatus 100 receives the ID of the vehicle 10 including the charging inlet 11. In one embodiment, an NFC tag having the ID of the vehicle 10 recorded thereon may be attached to one side of the charging inlet 11 and the ID of the vehicle 10 recorded on the NFC tag may be received by the communication unit 410. In one embodiment, at least one of the connection terminals provided in the charging inlet 11 may be used for communication and at least one of the connection pin provided in the charging connector 110 may receive the ID of the vehicle 10 from the communication connection terminal.

In step S530, the charging control apparatus 100 determines whether the received ID of the vehicle 10 is present in the authentication information list stored in the memory 430. In one embodiment, the controller 490 accesses the memory 430, acquires the authentication information list, and searches the authentication information list for the received vehicle ID. Based on the search result, whether the received vehicle ID is included in the authentication information list may be determined. If the ID of the vehicle 10 is not present in the authentication information list stored in the memory 430, that is, if authentication of the vehicle fails, the process S500 may end or the process S600 may be performed. If the ID of the vehicle 10 is present in the authentication information list stored in the memory 430, that is, if authentication of the vehicle 10 succeeds, step S540 is performed.

In step S540, the charging control apparatus 100 electrically connects the charging connector 110 with the plug 120.

In one embodiment, the switching unit 470 may be disposed in the control box 130, one end of the switching unit 470 may be connected to the charging connector 110, and the other end of the switching unit 470 may be connected to the plug 120. The controller 490 may control the switching unit 470 to electrically connect the charging connector 110 to the plug 120, if the ID of the vehicle 10 is present in the authentication information list stored in the memory 430. In contrast, the controller 490 may control the switching unit 470 to disconnect the charging connector 110 from the plug 120 if the ID of the vehicle 10 is not present in the authentication information list stored in the memory 430. If the plug 120 is electrically connected to the power supply 20, charging of the vehicle 10 is performed as the charging connector 110 is electrically connected to the plug 120.

In step S550, the charging control apparatus 100 determines whether the portable device of the user is located with a predetermined distance. The portable device of the user may be pre-authenticated to have the right to use the charging control apparatus 100. To this end, the process of authenticating the portable device may be previously performed. In one embodiment, the charging control apparatus 100 may process the portable device as having the right to use the charging control apparatus 100 if the ID of the portable device received based on short-range wireless communication by the communication unit 410 is included in the authentication information list. If the authenticated portable device is located beyond the predetermined distance, the process S500 may end or a process S700 may be performed. If the authenticated portable distance is located within the predetermined distance, step S560 is performed.

In step S560, the charging control apparatus 100 may unlock the charging connector 110 and the charging inlet 11. In one embodiment, the controller 490 may control the rotation direction of the locking driving module 122 and adjust the position of the locking bar 121 such that the projection 121a of the locking bar 121 does not meet the locking latch 12. For example, referring to FIG. 3, when the locking driving module 122 rotates in the counterclockwise direction, the projection 121a of the locking bar 121 may be separated from the locking latch 12. That is, the charging connector 110 and the charging inlet 11 may be unlocked. Meanwhile, as described above, the method of locking or unlocking the charging connector 110 and the charging inlet 11 is not limited the above-described example. It is apparent to those skilled in the art that any one of various well-known methods may be used.

In step S570, the charging control apparatus 100 may determine whether charging of the vehicle 10 ends. In one embodiment, the controller 490 may determine whether charging of the vehicle 10 ends based on a state of charge of the vehicle 10 received from the vehicle 10 through the communication unit 410 based on wired and/or wireless communication. In one embodiment, the controller 490 may determine whether charging of the vehicle 10 ends, based on a state of charge of the vehicle 10 received by any one connection pin for communication with the vehicle 10 among the connection pins provided in the charging connector 110. Upon determining that charging of the vehicle 10 ends, the process S500 may end. Upon determining that charging of the vehicle 10 is being performed, the controller 490 may return to step S550.

FIG. 6 is a flowchart illustrating an exemplary process S600 executed by a charging control apparatus 100 according to an embodiment of the present invention. As described above, the process S600 may be performed when the ID of the vehicle 10 is not present in the authentication information list in step S530 of the process S500. When the ID of the vehicle 10 is not present in the authentication information, the charging control apparatus 100 is highly likely to be unrightfully used or stolen.

If the process S600 starts, at least one of step S610 and step S620 may be performed.

In step S610, the charging control apparatus 100 may display a screen for requesting user authentication information. In one embodiment, the controller 490 may display a user interface including a plurality of buttons for selecting the type of user authentication information (e.g., fingerprint, barcode, QR code, voice, password and ID of the NFC tag) on the display unit 450 provided in the control box 130. The user may select any one of the plurality of buttons included in the user interface. The controller 490 may control the input unit 420 to receive the user authentication information of the type corresponding to the selected button.

In step S620, the charging control apparatus 100 may request input of the user authentication information from the above-described portable device in step S550. In one embodiment, the controller 490 may control the communication unit 410 to transmit a wireless signal for requesting input of the user authentication information to the portable device. In addition, the controller 490 may control the communication unit 410 to transmit a message indicating that authentication using the ID of the vehicle 10 failed to the portable device.

In step S630, the charging control apparatus 100 receives the user authentication information using at least one of the input unit 420 and the communication unit 410. For example, if a button selected by the user from among the plurality of buttons included in the user interface provided in step S610 corresponds to a QR code, the controller 490 may activate the barcode/QR code scanner 422 included in the input unit 420 and receive QR code type user authentication information.

In step S640, the charging control apparatus 100 determines whether the user authentication information received in step S640 is present in the authentication information list pre-stored in the memory 430. If the received user authentication information is present in the authentication information list pre-stored in the memory 430, that is, if authentication succeeds, step S540 of FIG. 5 may be performed. If the received user authentication information is not present in the authentication information list pre-stored in the memory 430, that is, if authentication fails, the controller 490 may perform predetermined operation. In one embodiment, the predetermined operation performed by the controller 490 may include at least one of step S652, step S654 and step S656.

In step S652, the controller 490 outputs a warning message. In one embodiment, the controller 490 may control the display unit 450 to output a visual warning message (e.g., "user authentication information is not identical") on the display unit 450. In one embodiment, the controller 490 may control the audio output unit 460 to output an audible warning message (e.g., warning sound). The warning message may be output for a predetermined time.

In step S654, the controller 490 may electrically disconnect the charging connector 110 from the plug 120. In one embodiment, the controller 490 may control the switching unit 470 to disconnect at least one point among electrical connection passages between the charging connector 110 and the plug 120.

In step S656, the controller 490 may control the communication unit 410 to transmit a notification to the portable device. In one embodiment, the notification transmitted to the portable device by the communication unit 410 may include at least one of (i) the ID of the vehicle 10 currently connected to the charging connector 110, (ii) an image received from the camera 426 included in the input unit 420, (iii) the position of the charging control apparatus 100 and (iv) CCTV information within a predetermined distance from the position of the charging control apparatus 100. In one embodiment, the position of the charging control apparatus 100 and the CCTV information may be acquired by the communication unit 410. Such notification may be transmitted to a police station server. The user of the portable device may check whether the charging control apparatus 100 thereof is unrightfully used by another person through the image of the camera 426 displayed on the screen of the portable device or the image of the CCTV. In addition, if the charging control apparatus 100 is currently stolen, the user of the portable device may notify the police station of the ID of the vehicle 10 included in the notification.

FIG. 7 is a flowchart illustrating an exemplary process S700 executed by a charging control apparatus 100 according to an embodiment of the present invention. As described above, the process S700 may be performed when the portable device is located beyond the predetermined distance from the charging control apparatus 100 in step S550 of the process S500.

In step S710, the charging control apparatus 100 may lock the charging connector 110 and the charging inlet 11. In one embodiment, the controller 490 may control the rotation direction of the locking driving module 122 and adjust the position of the locking bar 121 such that the projection 121*a* of the locking bar 121 meets the locking latch 12. For example, referring to FIG. 3, when the locking driving module 122 rotates in the clockwise direction, the projection 121*a* of the locking bar 121 may move toward the locking latch 12 downward. Then, movement of the main body of the charging connector 110 inserted into the main body of the charging inlet 11 may be restricted by the projection 121*a*. That is, the charging connector 110 and the charging inlet 11 may be locked. Therefore, if the portable device of the user is located beyond the predetermined distance from the charging control apparatus 100, the charging connector 110 and the charging inlet 11 are automatically locked, thereby preventing theft or unrightful use by another person. Meanwhile, after step S710, a process S800 may start, which will be described in detail with reference to FIG. 8.

In step S720, the charging control apparatus 100 determines whether external force exceeding a threshold, which is applied to the charging control apparatus 100, is sensed. In one embodiment, the alarm sensor 440 may be provided at one side of the charging connector 110 to measure external force applied to the charging connector 110 and/or the magnitude of motion of the charging connector 110. For example, when another person pulls the charging connector 110 in order to unrightfully use or steal the charging control apparatus 100, external force exceeding the threshold may be sensed by the alarm sensor 440. If external force equal to or less than the threshold is sensed, the process S700 may end. If external force exceeding the threshold is sensed, the controller 490 may perform predetermined operation. In one embodiment, the predetermined operation performed by the controller 490 may include at least one of step S732, step S734 and step S736.

In step S732, the controller 490 outputs a warning message. In one embodiment, the controller 490 may control the display unit 450 to output a visual warning message (e.g., "Locking is being performed. Don't touch the charging connector 110"). In one embodiment, the controller 490 may control the sound output unit 460 to output an audible warning message (e.g., warning sound). The warning message may be output for a predetermined time.

In step S734, the controller 490 may electrically disconnect the charging connector 110 from the plug 120. In one embodiment, the controller 490 may control the switching unit 470 to disconnect at least one point of electrical connection passages between the charging connector 110 and the plug 120. For example, the switching unit 470 may include a transistor connected between the charging connector 110 and the plug 120, may electrically connect the charging connector 110 with the plug 120 when the controller 490 applies a forward bias to the transistor, and may block current between the charging connector 110 and the plug 120 when the controller 490 applies a backward bias to the transistor.

In step S736, the controller 490 may control the communication unit 410 to transmit a notification to the portable device. In one embodiment, the notification transmitted to the portable device by the communication unit 410 may include at least one of (i) a time when external force exceeding the threshold is sensed, (ii) an image received from the camera 426 included in the input unit 420, and (iv) CCTV information within a predetermined distance from the position of the charging control apparatus 100. Unlike step S656, since the charging connector 110 is locked to the charging inlet 11, the ID of the vehicle 10 and the position of the charging control apparatus 100 may not be included in the notification. In one embodiment, the CCTV information may be acquired by the communication unit 410. Such notification may be transmitted to a police station server. The user of the portable device may check the surroundings (e.g., theft tried by another person) of the charging control apparatus 100 thereof in real time through the image of the camera 426 displayed on the screen of the portable device or the image of the CCTV.

FIG. 8 is a flowchart illustrating an exemplary process S800 executed by a charging control apparatus 100 according to an embodiment of the present invention. As described above, the process S800 may start when the portable device of the user is located beyond the predetermined distance and the charging connector 110 and the charging inlet 11 are locked in step S710 of the process S700.

In step S810, the controller 490 determines whether a request to use the charging control apparatus 100 by another person is received. While the charging connector 110 and the charging inlet 11 are locked, when touch input of another person is sensed by the touch sensor 423 or when the plug 120 and the power supply 20 are electrically connected, the display unit 450 may be controlled to display the user interface for receiving the request for use from another person. In one embodiment, the request for use by another person may be received by the input unit 420.

Specifically, the controller 490 may activate at least one of input means 421 to 426 included in the input unit 420 and receive the request for use from another person. The request for use may include information related to another person who requests to use the charging control apparatus 100 or a time when the charging control apparatus is used, for example. For example, if a button associated with the camera 426 is selected from among the plurality of buttons included in the user interface for receiving the request for use, the controller 490 may activate the camera 426. The controller 490 may recognize a face from images received from the camera 426 using a face recognition method and control the communication unit 410 to transmit the image including the recognized face to the portable device of the user.

In step S820, the controller 490 may control the communication unit 410 to transmit information indicating that the request for use by another person has received to the portable device. In this case, the charging control apparatus 100 may also transmit information related to another person (e.g., the image including the face of another person or the name of another person) received by the input unit 420 to the portable device.

In step S830, the controller 490 determines whether a command for granting the request for use by another person is received from the portable device. In one embodiment, the portable device located at a distant place (that is, beyond the predetermined distance of FIG. 5) may output the request for use by another person transmitted in step S820 such that the user can check the request for use by another person. In addition, the portable device may transmit a command for granting or rejecting the request for use to the charging control apparatus 100 according to user input.

If the command for rejecting the request for use is received from the portable device, the process S800 may end. Meanwhile, the controller 490 may control the display unit 450 to display a time remaining until charging of the vehicle 10 ends, when the command for rejecting the request for use is received by the communication unit 410. The remaining time may be received from the vehicle 10 by the communication unit 410. When the command for granting the request for use is received from the portable device, step S840 may be performed.

In step S840, the controller 490 may unlock the charging connector 110 and the charging inlet 11. In one embodiment, the controller 490 may rotate the locking driving module 122 in the clockwise direction such that the projection 121a of the locking bar 121 is separated from the locking latch 12, as shown in FIG. 3. Therefore, the main body 111 of the charging connector 110 may be separated from the main body 12 of the charging inlet 11. That is, the charging connector 110 and the charging inlet 11 may be unlocked. Even when the portable device of the user is located beyond the predetermined distance from the charging control apparatus 100, the charging connector 110 and the charging inlet 11 are unlocked according to the command received from the portable device, such that another person may connect the charging control apparatus 100 to another vehicle to charge another vehicle.

FIGS. 9a and 9b are diagrams showing an exemplary operation performed when a charging control apparatus 100 according to an embodiment of the present invention authenticates a vehicle 10.

In FIG. 9a, one side of the control box 130 may be connected to a first cable 121a and the other side thereof may be connected to a second cable 121b. In addition, the main body 131, the input unit 420, the display unit 450 and the sound output unit 460 may be disposed in the control box 130.

Various electronic parts are disposed in the internal space formed by the main body 131 of the control box 130. For example, the communication unit 410 may be disposed in the internal space of the main body 131. The main body 131 may be formed by molding a synthetic resin or may be formed of a metal such as stainless steel (STS), aluminum (Al), titanium (Ti), etc. In addition, for wireless communication, at least one antenna provided in the communication unit 410 may be disposed in the internal space of the main body 131. In one embodiment, the short-range communication module 412 may include an NFC module 412a, and the NFC module 412a may be provided inside or outside the main body 131 to read data from an external NFC tag approaching the main body 131. The data from the NFC tag may include the ID of the NFC tag, and the controller 490 may authenticate the user using the ID of the NFC tag. At this time, the data received from the NFT tag by the NFC module 412a may be coded into an NFC Data Exchange Format in the NFC forum.

In addition, the fingerprint scanner 421, the barcode/QR code scanner 422, the touch sensor 423, the microphone 424, the keypad 425 and the camera 426 included in the input unit 420 may be disposed in the main body 131 of the control box 130. Meanwhile, the touch sensor 423 may have an interlayered structure with the display unit 450 in order to realize a touchscreen. The fingerprint scanner 421, the barcode/QR code scanner 422, the touch sensor 423, the microphone 424, the keypad 425 and the camera 426 have been described with reference to FIG. 4 and thus a detailed description thereof will be omitted.

The controller 490 may display indicators 901 and 902 indicating the states of the charging connector 110 and the plug 120 on the display unit 450. For example, when the plug 120 is electrically connected to the power supply 20, as shown in FIG. 9a, the first indicator 901 may be turned on. In contrast, if the plug 120 is not connected to the power supply 20, the first indicator 901 may be turned off. As another example, while charging of the vehicle 10 connected to the charging connector 110 is performed, the second indicator 902 may be turned on. In contrast, while charging of the vehicle 10 connected to the charging connector 110 is not performed, the second indicator 902 may be turned off as shown in FIG. 9a.

The controller 490 may control the display unit 450 to display an indicator 903 indicating the authentication state of the vehicle 10. Specifically, the controller 490 may compare the ID of the vehicle 10 received from the vehicle 10 with the authentication information list pre-stored in the memory 430 and determine whether the vehicle 10 has the right to use the charging control apparatus 100.

If the ID of the vehicle 10 received from the vehicle 10 is present in the authentication information list pre-stored in the memory 430, the controller 490 may display a message indicating that authentication of the vehicle 10 has succeeded (e.g., "vehicle authentication success") on the display unit 450 as shown in FIG. 9b. In one embodiment, if vehicle authentication succeeds, the controller 490 may perform charging of the vehicle 10 immediately or according to user command. If charging of the vehicle 10 is being performed, the second indicator 902 may be turned on unlike FIG. 9a. Therefore, the user of the charging control apparatus 100 may easily check whether the vehicle 10 is normally charged with electric energy received from the power supply 20.

Meanwhile, at least one component disposed in the control box 130 may be disposed in the charging connector 110 instead of the control box 130. For example, the NFC module 412a may be disposed in the main body 111 of the charging connector 110.

FIGS. 10a and 10b are diagrams showing an exemplary operation performed when a charging control apparatus 100 according to an embodiment of the present invention is locked to a charging inlet 11 provided in a vehicle according to the position of the portable device 200 of a user.

FIG. 10a shows the state in which the charging control apparatus 100 electrically connects the vehicle 10 to the power supply 20. Assume that the portable device 200 of the user of the charging control apparatus 100 is previously authenticated by the communication unit 410 provided in the control box 130.

The communication unit 410 may measure the signal intensity of the wireless signal received from the portable device 200. The controller 490 may compare the signal intensity measured by the communication unit 410 with a threshold pre-stored in the memory 430 and determine whether the portable device 200 is located within a predetermined distance from the charging control apparatus 100. For example, if the signal intensity measured by the communication unit 410 is less than the threshold, the controller 490 may determine that the portable device 20 is located beyond the predetermined distance from the charging control apparatus 100. That is, the controller 490 may determine that the current position of the portable device 200 is outside a range S determined by the threshold.

In one embodiment, upon determining that the current position of the portable device 200 is outside the range S, the controller 490 may rotate the locking driving module 122 in the counterclockwise direction such that the locking bar 121 moves downward to meet the locking latch 14, as shown in FIG. 10b. Therefore, unless the locking driving module 122 rotates in the clockwise direction to return to the original position, the state of fastening the charging connector 110 and the charging inlet 11 is continuously maintained, thereby preventing detachment or theft by another person.

In FIGS. 10a and 10b, when the user moves far away from the charging control apparatus 100, since the charging connector 110 is automatically locked to the charging inlet 11, it is possible to suppress theft or unrightful use of the charging control apparatus 100.

FIGS. 11a and 11b are diagrams showing an exemplary operation performed when a charging control apparatus 100 according to an embodiment of the present invention authenticates a user.

In FIG. 11a, if the ID of the vehicle 10 is not present in the authentication information list pre-stored in the memory 430, the controller 490 may control the display unit 450 to display a message indicating that authentication of the vehicle 10 failed.

In addition, the controller 490 may control the display unit 450 to display a screen for requesting input of user authentication information for authenticating the user instead of the ID of the vehicle 10. The user authentication information may be received by the input unit 420 and/or the communication unit 410. Specifically, as shown in FIG. 11a, a user interface for providing a plurality of menus 1111 to 1115 may be displayed on the display unit 450. For example, when the menu 1111 is selected, the controller 490 may activate the fingerprint scanner 421 to recognize the fingerprint of the user. When the menu 1112 is selected, the controller 490 may activate the barcode/QR code scanner 422 to recognize a barcode or QR code located close to the barcode/QR code scanner 422. When the menu 1113 is selected, the controller 490 may activate the microphone 424 to recognize the voice of the user. The controller 490 may check whether the feature of the voice received by the microphone 424 (e.g., voice print) is present in the authentication information list using a voice authentication scheme. When the menu 114 is selected, the controller 490 may activate the keypad 425 to receive a password. When the menu 1115 is selected, the controller 490 may activate the NFC module 412a to read information recorded on the NFC tag located close to the NFC module 412a.

Meanwhile, the controller 490 may activate at least one of the fingerprint scanner 421, the barcode/QR code scanner 422, the microphone 424, the touch sensor 423 and the NFC module and receive the user authentication information from the user, based on the voice of the user received by the microphone 424. For example, as shown in the figure, the controller 490 may activate the barcode/QR code scanner 422 in response to user voice (e.g., "I will input a QR code") specifying the type of the user authentication information.

FIG. 11b shows an exemplary operation of the charging control apparatus 100 when the barcode/QR code scanner 422 is selected as an input means of the user authentication information as shown in FIG. 11a.

The user may locate a medium (e.g., business card) 1120, on which a QR code including authentication information of the charging control apparatus 100 is printed, in the scanning region of the barcode/QR code scanner 422. The barcode/QR code scanner 422 may recognize the QR code displayed on the medium 1120 and determine whether user authentication information corresponding to the recognized QR code is present in the authentication information list stored in the memory 430.

If the user authentication information corresponding to the QR code read from the medium 1120 is present in the authentication information list, the controller 490 may control the display unit 450 to display a message indicating that authentication of the QR code has succeeded. In addition, the controller 490 may perform control such that the switching unit 470 electrically connects the charging connector 110 to the power supply 20, thereby performing charging of the vehicle 10. Therefore, the second indicator 902 may be switched from the OFF state shown in FIG. 9a to the ON state shown in FIG. 11b.

Although the user authentication method using the QR code is only described with reference to FIGS. 11a and 11b, it is apparent to those skilled in the art that a variety of user authentication information such as fingerprint, barcode, NFC tag, password, etc. may be used to authenticate the user.

FIG. 12 is a diagram showing an exemplary operation performed when a charging control apparatus 100 according to an embodiment of the present invention authenticates a user.

In FIG. 12, if the ID of the vehicle 10 is not present in the authentication information list pre-stored in the memory 430, the controller 490 may control the communication unit 410 to transmit a message indicating that authentication of the vehicle 10 failed (e.g., "The charging control apparatus is connected to an unregistered vehicle") to the portable device 200.

The portable device 200 may receive the message from the charging control apparatus 100, execute a specific application installed in the portable device 200 and display a user interface for input of user authentication information. Specifically, as shown in FIG. 11a, a plurality of menus 1211 to 1216 may be included in the user interface displayed on the screen of the portable device 200. For example, when the menu 1211 is selected, the portable device 200 may recognize and transmit the fingerprint of the user to the charging control apparatus 100. When the menu 1212 is selected, the portable device 200 may recognize and transmit the barcode or QR code provided by the user to the charging control apparatus 100. When the menu 1213 is selected, the portable device 200 may transmit the voice of the user received by the portable device 200 to the charging control apparatus 100. When the menu 1214 is selected, the portable device 200 may transmit the password input by the user to the charging control apparatus 100. When the menu 1215 is selected, the portable device 200 may transmit information on the NFC tag read by the portable device 200 to the charging control apparatus 100. Meanwhile, when the menu 1215 is selected, the portable device 200 may report theft of the charging control apparatus 100 to an external server (e.g., police station server).

FIG. 13 is a diagram showing an exemplary operation performed when a charging control apparatus 100 according to an embodiment of the present invention fails to authenticate a vehicle 10 and a user. Specifically, FIG. 13 shows an exemplary operation related to at least one of step S652, step S654 and step S656 shown in FIG. 6.

In FIG. 13, the controller 490 may perform predetermined operation when authentication performed based on the ID of the vehicle 10 and the user authentication information fails. In one embodiment, the predetermined operation performed by the controller 490 may include at least one of (i) warning message output, (ii) electrical disconnection between the charging connector 110 and the power supply 20 and (ii) transmission of a notification to the portable device 200.

The controller 490 may control the display unit 450 to display a message indicating that authentication does not end and thus charging of the vehicle 10 using the charging control apparatus 100 is impossible (e.g., "User authentication failed and charging was stopped"). In addition, the controller 490 may control the audio output unit 460 to output a warning sound.

The controller 490 may control the switching unit 470 to electrically disconnect the charging connector 110 from the plug 120. Therefore, even when the plug 120 is electrically connected to the power supply 20 and the charging connector 110 is electrically connected to the vehicle 10, charging of the vehicle 10 may not be performed. In addition, the second indicator 902 may be maintained in the OFF state shown in FIG. 9a.

In addition, the controller 490 may activate the camera 426 and generate peripheral images of the charging control apparatus 100 when authentication performed based on the ID of the vehicle 10 and the user authentication information fails. The images generated by the camera 426 may be stored in the memory 430 and used as evidence data when the charging control apparatus 100 is stolen.

Meanwhile, the controller 490 may control the communication unit 410 to transmit a notification to the portable device 200 of the user, when authentication performed based on the ID of the vehicle 10 and the user authentication information fails. The notification transmitted to the portable device 200 may include at least one of (i) the ID of the vehicle 10 connected to the charging control apparatus 100, (ii) the image received from the camera 426, (iii) the position of the charging control apparatus 100 and (iv) CCTV information within the predetermined distance from the position of the charging control apparatus 100.

The portable device 200 may execute a specific application installed in the portable device 200 and display a user interface for checking the notification, upon receiving the notification from the charging control apparatus 100. Specifically, as shown in FIG. 13, the user interface displayed on the screen of the portable device 200 may include a plurality of menus 1311 to 1315. For example, when the menu 1311 is selected, the current position of the charging control apparatus 100 may be displayed on the screen of the portable device 200. When the menu 1312 is selected, the ID of the vehicle 10 currently connected to the charging control apparatus 100 may be displayed on the screen of the portable device 200. When the menu 1313 is selected, the image captured by the camera 426 may be displayed on the screen of the portable device 200. When the menu 1314 is selected, the image captured by the CCTV located near the charging control apparatus 100 may be displayed on the screen of the portable device 200. When the menu 1314 is selected, the portable device 200 may report theft of the charging control apparatus 100 to an external server (e.g., police station server).

FIGS. 14a and 14b are diagrams showing an exemplary operation performed when external force is applied to a charging control apparatus 100 according to an embodiment of the present invention. Specifically, FIG. 14 shows an exemplary operation related to at least one of step S732, step S734 and step S736 shown in FIG. 7.

In FIG. 14a, in a state in which the charging connector 110 and the charging inlet 11 are locked, the alarm sensor 440 may sense external force applied to the charging control apparatus 100. In one embodiment, external force applied to the charging control apparatus 100 may be sensed by the impact sensor 441 or the motion sensor 442. For example, the impact sensor 441 is disposed in the projection 121a of the locking bar 121 to sense pulling of the charging control apparatus 100 by another person 1400. As another example, the motion sensor 442 is disposed in the cable 101 to sense the magnitude of motion of the cable 101 by another person 1400 (e.g., degree of deformation of the cable, movement speed, or movement distance).

The controller 490 may perform predetermined operation when external force sensed by the alarm sensor 440 exceeds a threshold. In one embodiment, the predetermined operation performed by the controller 490 may include at least one of (i) warning message output, (ii) electrical disconnection between the charging connector 110 and the power supply 20 and (ii) transmission of the notification to the portable device 200.

Specifically, the controller 490 may control the display unit 450 to display a warning message (e.g., "External force suspected as theft is sensed. Charging is stopped."). In addition, the controller 490 may control the audio output unit 460 to output warning sound.

The controller 490 may control the switching unit 470 to electrically disconnect the charging connector 110 from the plug 120. Therefore, even when the plug 120 is electrically connected to the power supply 20 and the charging connector 110 is electrically connected to the vehicle 10, charging of the vehicle 10 may not be performed. Thus, the second indicator 902 may be maintained in the OFF state, as shown in FIG. 9.

In addition, the controller 490 may activate the camera 426 and generate the peripheral images of the charging control apparatus 100, when external force exceeding the threshold is sensed. The images generated by the camera 426 may be stored in the memory 430 and used as evidence data when the charging control apparatus 100 is stolen.

Meanwhile, the controller 490 may control the communication unit 410 to transmit the notification to the portable device 200 of the user. The notification transmitted to the portable device 200 may include, for example, at least one of (i) a time when external force is sensed, (ii) the image received from the camera 426 and (iii) CCTV information within the predetermined distance from the position of the charging control apparatus 100. Meanwhile, since the charging control apparatus 100 is currently connected to the authenticated vehicle 10, unlike FIG. 13, the position of the charging control apparatus 100 and the ID of the vehicle 10 may not be included in the notification.

The portable device 200 may execute a specific application installed in the portable device 200 and display a user interface for checking the notification, upon receiving the notification from the charging control apparatus 100. Specifically, as shown in FIG. 14b, the user interface including the plurality of menus 1411 to 1413 may be displayed on the screen of the portable device 200 along with the time when external force is sensed (e.g., "2015 Aug. 15 PM 3:35"). For example, when the menu 1411 is selected, the image captured by the camera 426 may be displayed on the screen of the portable device 200. When the menu 1412 is selected, the image captured by the CCTV located near the charging control apparatus 100 may be displayed on the screen of the portable device 200. When the menu 1413 is selected, the portable device 200 may report theft of the charging control apparatus 100 to an external server (e.g., police station server).

FIG. 15 is a diagram showing an exemplary operation performed by a charging control apparatus 100 according to an embodiment of the present invention.

The controller 490 may control the display unit 450 to display information related to at least one of the vehicle 10 and the charging control apparatus 100.

Specifically, FIG. 15 shows exemplary information displayed on the display unit 450 while charging of the vehicle 10 is being performed, by electrically connecting the charging connector 110 to the plug 120, as in step S540 shown in FIG. 5.

Since charging of the vehicle 10 is being performed, the first indicator 901 and the second indicator 902 may be displayed in the ON state.

A time (e.g., 04:29) remaining until charging of the vehicle 10 ends and the state of charge (e.g., 50%) of the vehicle 10 may be displayed at one side of the display unit 450. The state of charge of the vehicle 10 and the time remaining until charging ends may be provided by the vehicle 10. In this case, the controller 490 may calculate electric rates imposed on the user of the charging control apparatus 100 based on the time (e.g., 04:29) remaining until charging ends and the state of charge (e.g., 50%) of the vehicle 10 and display information indicating the calculated electric rates (e.g., 13,000 won) on the display unit 450. In one embodiment, the controller may unlock the charging connector 110 and the charging inlet 11, when a signal indicating that the electric rates are paid is received from the portable device or the external server.

Meanwhile, at least some of the information displayed on the display unit 450 may be transmitted to the portable device 200. For example, when the user is located beyond the predetermined distance from the charging control apparatus 100, the user may check the time remaining until charging of the vehicle 10 ends using the portable device 200 and move to a place where the charging control apparatus 100 is located before charging ends.

FIGS. 16a and 16b are diagrams showing an exemplary operation performed by a charging control apparatus 100 according to an embodiment of the present invention.

FIG. 16a shows an exemplary situation wherein a request for use by another person is received while charging of the vehicle 10 is performed by the charging control apparatus 100. Since charging of the vehicle 10 is being performed, the first indicator 901 and the second indicator 902 may be displayed in the ON state.

In FIG. 16a, when a predetermined event occurs while charging of the vehicle 10 is performed, the controller 490 may display a button 1610 for receiving a request for use from another person at one side of the display unit 450. For example, when at least one of various events occurs, such as when touch is received by the touch sensor 423, when sound having a predetermined volume is sensed by the microphone 424, when shaking of the charging control apparatus 100 exceeding a predetermined magnitude is sensed, or when electrical disconnection between the plug 120 and the power supply 20 is sensed, the button 1610 may be displayed on the display unit 450.

The controller 490 may control the communication unit 410 to transmit information indicating that the request for use is received to the portable device 200, upon receiving the request for use from another person through the input unit 420. For example, when the button 1610 is selected, the controller 490 may activate the camera 426, generate the peripheral images of the charging control apparatus 100 and transmit the generated image to the portable device 200. As another example, when the button 1610 is selected, the controller 490 may display the user interface for receiving the personal information of the person who requests to use the charging control apparatus 100 and transmit the personal information received by the user interface to the portable device 200.

Meanwhile, the portable device 200 may display a user interface including a plurality of menus 1621 to 1623 as shown in the figure, upon receiving the information indicating that the request for use by another person is received from the charging control apparatus 100. For example, when the menu 1621 is selected, the portable device 200 may display information related to another person who has requested to use the charging control apparatus 100. When the menu 1622 is selected, the portable device 200 may transmit a command for granting the request for use to the charging control apparatus 100. The controller 490 may unlock the charging connector 110 and the charging inlet 11 in response to the command for granting the request for use. When the menu 1623 is selected, the portable device 200 may transmit a command for rejecting the request for use to the charging control apparatus 100. The controller 490 may maintain the lock state between the charging connector 110 and the charging inlet 11 in response to the command for rejecting the request for use.

FIG. 16b shows exemplary information displayed on the portable device 200 when the menu 1621 shown in FIG. 16a is selected. The controller 490 may activate the camera 426 in response to selection of the menu 1621 displayed on the portable device 200 and transmit the image generated by the camera 427 to the portable device 200. Therefore, the image 1630 provided by the camera 426 may be displayed on the screen of the portable device 200. For example, the user may select the menu 1622 when another person appearing on the image 1630 is a reliable person (e.g., family or friend). The controller 490 may unlock the charging connector 110 and the charging inlet 11 such that another person disconnects the charging control apparatus 100 from the vehicle 10 in response to selection of the menu 1622. In contrast, when the user selects the menu 1623, the controller 490 may maintain the lock state between the charging connector 110 and the charging inlet 11.

The above-described embodiments of the present invention are implemented not only by the apparatus and the method but also by a program for realizing a function corresponding to the configuration of the embodiment of the present invention or a recording medium having the program recorded thereon, which may be easily implemented by those skilled in the art, to which the present invention pertains, from the description of the above-described embodiments.

In addition, since those skilled in the art will appreciate that various substitutions, modifications and changes are possible, without departing from the scope and spirit of the invention, the present invention is not limited to the above-described embodiments and the accompanying drawings and all or some of the embodiments may be selectively combined to implement various changes.

The invention claimed is:

1. A charging control apparatus comprising:
    a communication device for wired or wireless communication between the charging control apparatus and a vehicle or between the charging control apparatus and a portable device;
    a charging connector electrically connected to a charging inlet provided in the vehicle;
    a locking device provided in the charging connector to lock or unlock the charging connector and the charging inlet; and
    a controller for checking whether an ID of the vehicle received by the communication device is included in a pre-stored authentication information list in response to electrical connection between the charging connector and the charging inlet, determining whether the charging connector and the charging inlet are unlocked according to a position of a pre-authenticated portable device when the ID of the vehicle is included in the pre-stored authentication information list, and controlling the locking device according to the determination.

2. The charging control apparatus according to claim 1, wherein the controller determines whether the charging connector and the charging inlet are unlocked according to the position of the portable device, when the ID of the portable device received by the communication device is included in the authentication information list.

3. The charging control apparatus according to claim 1, wherein the controller determines whether the portable device is located within a predetermined distance from the charging control apparatus, based on a signal intensity of a wireless signal received from the portable device by the communication device.

4. The charging control apparatus according to claim 1, wherein the controller determines whether the portable device is located within a predetermined distance from the charging control apparatus based on GPS coordinates of the portable device received from the portable device.

5. The charging control apparatus according to claim 1, wherein the controller controls the locking device to lock the charging connector and the charging inlet, when the portable device is located beyond a predetermined distance from the charging control apparatus.

6. The charging control apparatus according to claim 1, wherein the controller controls the locking device to unlock the charging connector and the charging inlet, when the portable device is located within a predetermined distance from the charging control apparatus.

7. The charging control apparatus according to claim 5, further comprising at least one of a fingerprint scanner, a barcode/QR code scanner, a touch sensor, a microphone, a keypad and a camera.

8. The charging control apparatus according to claim 7, further comprising a display unit for displaying information, wherein the controller controls the display unit to display a screen for requesting to input at least one piece of user authentication information included in the authentication information, when the ID of the vehicle is not included in the authentication information list.

9. The charging control apparatus according to claim 8, wherein the controller determines whether the charging connector and the charging inlet are unlocked according to the position of the portable device, when the user authentication information is included in the authentication information list.

10. The charging control apparatus according to claim 7, wherein the controller controls the communication device to request at least one piece of user authentication information included in the authentication information list from the portable device, when the ID of the vehicle is not included in the authentication information list.

11. The charging control apparatus according to claim 10, wherein the controller determines whether the charging connector and the charging inlet are unlocked according to the position of the portable device, when the user authentication information transmitted from the portable device and received by the communication device in response to the request is included in the authentication information list.

12. The charging control apparatus according to claim 8, wherein the user authentication information includes at least one of a fingerprint, a barcode, a QR code, voice, a password and an ID of an NFC tag.

13. The charging control apparatus according to claim 9, wherein the controller performs predetermined operation when the received user authentication information is not included in the authentication information list.

14. The charging control apparatus according to claim 13, wherein the operation includes (i) warning message output, (ii) electrical disconnection between the charging connector and a power supply and (ii) transmission of a notification to the portable device, and
wherein the notification includes at least one of (i) the ID of the vehicle, (ii) an image received from the camera, (iii) a position of the charging control apparatus and (iv) CCTV information within a predetermined distance from the position of the charging control apparatus.

15. The charging control apparatus according to claim 5, further comprising an alarm sensor for detecting external force applied to the charging control apparatus,
wherein the controller performs predetermined operation when the external force exceeds a predetermined threshold in a state in which the charging connector and the charging inlet are locked by the locking device.

16. The charging control apparatus according to claim 15, wherein the operation includes (i) warning message output, (ii) electrical disconnection between the charging connector and a power supply and (ii) transmission of a notification to the portable device, and
wherein the notification includes at least one of (i) a time when the external force is sensed, (ii) an image received from the camera and (iii) CCTV information within a predetermined distance from the position of the charging control apparatus.

17. The charging control apparatus according to claim 5, wherein the controller unlocks the charging connector and the charging inlet based on a command received from the portable device by the communication device, in a state of locking the charging connector and the charging inlet.

18. The charging control apparatus according to claim 8, wherein the controller controls the display unit to display information related to at least one of the vehicle and the charging control apparatus.

19. The charging control apparatus according to claim 7, wherein, when a request for use is received from another person, the controller controls the communication device to transmit, to the portable device, information indicating that a request for use has been received.

20. The charging control apparatus according to claim 1, further comprising:
a plug connected to a power supply for supplying electric energy; and
a switching unit for electrically connecting or disconnecting the charging connector to or from the power supply according to a command received from the controller.

* * * * *